(12) United States Patent
Tseng

(10) Patent No.: US 11,148,548 B2
(45) Date of Patent: Oct. 19, 2021

(54) ELECTRIC VEHICLE PARKING ENERGY SUPPLY SYSTEM

(71) Applicant: ELECTRIC ENERGY EXPRESS CORPORATION, Zubei (TW)

(72) Inventor: Ling-Yuan Tseng, Zubei (TW)

(73) Assignee: Electric Energy Express Corporation, Zubei (TW)

( * ) Notice: Subject to any disclaimer, the term of this patent is extended or adjusted under 35 U.S.C. 154(b) by 337 days.

(21) Appl. No.: 16/413,959

(22) Filed: May 16, 2019

(65) Prior Publication Data

US 2019/0366868 A1 Dec. 5, 2019

(30) Foreign Application Priority Data

Jun. 5, 2018 (TW) .................................. 107119383

(51) Int. Cl.
| | |
|---|---|
| H02J 7/00 | (2006.01) |
| B60L 53/66 | (2019.01) |
| B60L 53/30 | (2019.01) |
| B60L 53/16 | (2019.01) |
| E04H 6/22 | (2006.01) |
| E04H 6/42 | (2006.01) |
| B60L 53/54 | (2019.01) |

(52) U.S. Cl.
CPC ............ *B60L 53/665* (2019.02); *B60L 53/16* (2019.02); *B60L 53/305* (2019.02); *B60L 53/54* (2019.02); *E04H 6/22* (2013.01); *E04H 6/42* (2013.01); *H02J 7/0027* (2013.01); *B60Y 2200/91* (2013.01)

(58) Field of Classification Search
None
See application file for complete search history.

(56) References Cited

FOREIGN PATENT DOCUMENTS

| | | |
|---|---|---|
| JP | 5513831 B2 | 4/2014 |
| TW | 503798 I | 10/2015 |
| TW | 594903 I | 8/2017 |

*Primary Examiner* — Arun C Williams
(74) *Attorney, Agent, or Firm* — Rosenberg, Klein & Lee

(57) ABSTRACT

An electric vehicle parking energy supply system includes at least one electric power control unit that is connected with at least one electric power generation system, a parking tower having multiple vehicle carrying platforms that are movable in multiple axes for receiving electric vehicles to park thereon, multiple power buses, a power charging control unit arranged on each vehicle carrying platform for connection with and charging the electric vehicle, and at least one electric vehicle charging management center. The power charging control unit controls bidirectional electric energy supply for supplying working power required by the parking tower, the vehicle carrying platforms, and the power buses and selling extra power back to a commercial power supply. The power buses are arranged longitudinally to each correspond to one side of a predetermined location of each of the vehicle carrying platforms of the parking tower. Each power charging control unit includes at least one power collection device, which is contactable with the power buses when the vehicle carrying platforms move to the predetermined location for parking in order to allow the power charging control unit to supply charging power to charge the electric vehicle. The electric vehicle charging management center remotely monitors and controls, by means of connection through a network, the bidirectional energy supply of the electric power control unit and the charging status of the electric vehicle with each power charging control unit.

22 Claims, 16 Drawing Sheets

ELECTRIC VEHICLE PARKING ENERGY SUPPLY SYSTEM

BACKGROUND OF THE INVENTION

1. Field of the Invention

The present invention relates to an electric vehicle parking energy supply system, and in particular to a bidirectional energy supply system that is applicable to a parking tower and comprises at least one power generation system for parking operation and charging power for electric vehicles, remote charging status monitoring and power feedback and sale back.

2. The Related Arts

Electric vehicles are a major transportation for the next century. Green energy policy and environmental protection make the number of electric vehicles, such as electric motorcycles and electric automobiles, increased year by year. Power charging systems are thus important for electric batteries that the electric vehicles rely on as a major power source.

Most of the known ways of charging of electric vehicles and battery exchange are based on charging stations, charging poles, charging stands, or battery exchange cabinets that are installed at fixed locations. The increasing number of electric vehicles would require additional space for parking and charging. This would worsen the need for parking space that is occupied by gasoline or diesel driving vehicles. This would be a problem to be handled for the popularization of electric vehicles.

Further, electric vehicles, when set in charging, must be watched by the owner for monitoring the charging status and also for keeping an eye on the vehicles for burglary protection purposes. This requires the owners to stay beside the vehicles for an extended period of time and is thus inconvenient for the vehicle owners.

Further, considering an arrangement of a power socket in each parking space of a parking tower for charging an electric vehicle, power cables must be built up and arranged in walls or floors of the parking tower and the parking spaces. This increases the cost of building of the parking tower in respect of working hours and material. Further, it is a common safety practice to prohibit passengers from getting in and out of vehicles in the parking space of the parking tower and this makes it difficult for a driver to manually plug a power cable into the charging socket. Considering a different arrangement that a support or movable table is provided with a charging socket, a power cable must be provided in a suspended condition for the support or movable table. Again, cost of building is increased. In addition, the movable table must be structured to move and rotate in multiple directions. This would cause potential issues of damages or breaking of the power cable due to movement of the movable table.

Prior art patent documents in this field are known. An example is Taiwan Patent Publication No. 1594903, which describes the known technique of typical charging pole based electric vehicle charging system. As discussed above, this kind of system requires a large space for vehicles to park and charge, and also, vehicle owners must stay close for watching.

Japanese Patent No. 5513831 describes a system including switches (30)-(32), (33) having contact terminals (A1, B1)-(A3, B3), (A4, B4, C4, D4)-(An, Bn, Cn, Dn) with a charging control section (36) monitoring charging operations of electric vehicles (Ev1)-(EVn).

Due to the complicated arrangement of switches (30)-(32), (33), the cost is high and any failure of the switches (30)-(32), (33) would lead to interruption of charging operations of the electric vehicles (Ev1)-(EVn).

Further, such a system provides parking for the electric vehicles (Ev1)-(EVn) and other, non-electric vehicles; however, two types of supports must be provided for different types of vehicles. This again increases the cost of building of such a system.

In addition, in such a system, a power supply means (50) requires a socket (52) provided on the support to connect to a power plug (51) for supply of power. This would increase the cost of building and also requires high accuracy of alignment between the socket and the plug, leading to potential risk of damage caused by inaccurate positioning of the components.

Such a system only provides one way of energy supply that requires power supply from the outside and is generally a large power loading, making it impractical for general purpose use.

Taiwan Patent Publication No. 1503798 provides a different prior art system, which suffers the same problems discussed above.

An additional shortcoming of the known systems is that it requires a backup power supply system that is often kept in idle, but take a large amount to build up. Such a backup power supply system can only supplies electric power to the system, making it impractical for general purpose use.

SUMMARY OF THE INVENTION

The primary objective of the present invention is to provide an electric vehicle parking energy supply system that helps eliminate the drawbacks of the prior art devices that require a large space for charging operation as they use a charging station or a charging pole or a charging stand to carry out the charging operations and that requires users to stand close thereto for watching the status of charging, or that a point-to-point plugging socket and power plug arranged in a carrying support and parking location of a parking tower or a power receiving device and a power supplying device, which require high accuracy of alignment so that the operation is difficult and potential risk of electric shorting caused by being not correctly contacting may occur, and that the prior art parking tower provides sharable parking operation and charging power, which make the operation of the device constrained and the supply of power is also constrained, and that the energy supply of the charging power supplied in the prior art charging tower is made in just one direction and is only functioning as an electric loading of a large amount of power consumption, and that an long-idle backup power system is required in the prior art that is normally not put into operation so as to increase the overall cost and not provide an effective application of use for areas where power supply is limited.

In view of the above, the present invention provides an electric vehicle parking energy supply system, which comprises:

at least one electric power control unit, which is connected with at least one electric power generation system, the electric power control unit comprising a bidirectional supply control function for multiple types of electric energy, the electric power control unit receiving electric power supplied from the electric power generation system for conversion into an output power;

at least one parking tower, which comprises a plurality of vehicle carrying platforms that are movable in multiple axes for receiving electric vehicles to park thereon, the parking tower being connected with the electric power control unit to receive the output power output from the electric power control unit to serve as electric power for movement and parking operation of the vehicle carrying platforms of the parking tower;

a plurality of power buses, which are arranged longitudinally to each correspond to one side of a predetermined location of each of the vehicle carrying platforms of the parking tower and are connected with the electric power control unit to serve as an electric energy bidirectional supply channel of the electric power control unit;

a plurality of power charging control units, each of which is arranged on each vehicle carrying platform of the parking tower, each power charging control unit being operable for charging of the electric vehicle, each power charging control unit being provided with at least one power collection device, the power collection device being contactable and electrically connectable with the power buses when the vehicle carrying platforms are moved to predetermined parking positions to have the power charging control unit to supply charging power to the electric vehicle for charging, or to feed at least one type of feedback power formed of electric power of from at least one battery of the electric vehicle through the power buses into the electric power control unit to be converted by the electric power control unit into return-back power for output, the power charging control unit comprising a function of detecting a charging status of the battery of the electric vehicle and outputting battery charging status data; and at least one electric vehicle charging management center, which is connected with the electric power control unit and each power charging control unit, so that the electric vehicle charging management center is operable to remotely monitor and control, by way of connection through a network, the bidirectional energy supply of the electric power control unit and the charging status of the electric vehicle connected with each power charging control unit according to the output power output from the electric power control unit and the battery charging status data of each power charging control unit.

Further, in the electric vehicle parking energy supply system of the present invention, the electric power generation system connected with the electric power control unit is formed of a fuel cell based electric power generation system.

In the electric vehicle parking energy supply system of the present invention, the electric power control unit is connected with an alternate-current commercial power supply.

In the electric vehicle parking energy supply system of the present invention, the electric power control unit is connected with at least one type of clean energy.

In the electric vehicle parking energy supply system of the present invention, the electric power control unit is connected with at least one battery exchange management center, the battery exchange management center being connected with at least one battery exchange cabinet and the electric vehicle charging management center to receive an remote monitor instruction from the electric vehicle charging management center to supply the return-back power output from the electric power control unit to each exchangeable battery located in the battery exchange cabinet as charging power, or allowing the electric vehicle charging management center to feed electric power from each exchangeable battery located in the battery exchange cabinet back to the electric power control unit.

In the electric vehicle parking energy supply system of the present invention, the electric power control unit comprises:

at least one input power conversion device, which is connected with the electric power generation system and the power buses, the input power conversion device receiving electric power supplied from the electric power generation system for conversion into output power to be output to the power buses;

at least one output power conversion device, which is connected with the power buses to feed electric power from at least one battery inside the electric vehicle that is connected with the power charging control unit arranged on each vehicle carrying platform of the parking tower through the power charging control unit and the power buses into the output power conversion device in order to convert the electric power from the at least one battery of the electric vehicle with which each power charging control unit is connected into return-back power for output;

at least one bidirectional power control device, which is connected with the input power conversion device and the output power conversion device to control timing of outputting of the output power of the input power conversion device and the return-back power of the output power conversion device;

at least one communication interface, which is connected with the bidirectional power control device and the electric vehicle charging management center to receive the remote monitor instruction from the electric vehicle charging management center in order to feed the remote monitor instruction of the electric vehicle charging management center to the bidirectional power control device to serve as basis for the bidirectional power control device to control the timing of outputting of the output power of the input power conversion device and the return-back power of the output power conversion device; and at least one electric power unit, which is connected with the electric power generation system, at least one power bus, the input power conversion device, the output power conversion device, the bidirectional power control device, and the communication interface in order to convert the electric power generated by the electric power generation system or the electric power from the at least one battery of the electric vehicle that is connected with the at least one power charging control unit of the at least one power bus into at least one type of working power that is output to the input power conversion device, the output power conversion device, the bidirectional power control device, and the communication interface.

In the electric vehicle parking energy supply system of the present invention, the output power conversion device of the electric power control unit is connected with at least one intelligent electric meter, the intelligent electric meter being connected with at least one commercial power supply so that the return-back power output from the output power conversion device is sold back to the commercial power supply by means of the intelligent electric meter.

In the electric vehicle parking energy supply system of the present invention, the output power conversion device of the electric power control unit is connected with the electric power generation system in order to convert a portion of the electric power generated by the electric power generation system into the return-back power for output.

In the electric vehicle parking energy supply system of the present invention, the parking tower is provided with a power supply section, and the output power conversion device of the electric power control unit is connected with the power supply section of the parking tower in order to output the return-back power of the output power conversion device to the power supply section.

In the electric vehicle parking energy supply system of the present invention, the communication interface of the electric power control unit is connected via at least one network with the electric vehicle charging management center.

In the electric vehicle parking energy supply system of the present invention, the communication interface of the electric power control unit is formed of a wireless communication interface in order to connect via at least one wireless network with the electric vehicle charging management center.

In the electric vehicle parking energy supply system of the present invention, the power charging control units comprise:

at least one charging power transformation module, which is connected with the power collection device, so that through the power collection device being set in contact with the power buses for the vehicle carrying platform that is moved to the predetermined parking position, the charging power transformation module receives the output power output from the electric power control unit for conversion into at least one type of charging power for output;

at least one charging/feedback power output interface, which is connected with the charging power transformation module and the battery of the electric vehicle on the vehicle carrying platforms of the parking tower in order to feed the charging power converted and output by the charging power transformation module into the battery of the electric vehicle for charging, the charging/feedback power output interface being operable to detect a charging status of the battery of the electric vehicle on the vehicle carrying platforms of the parking tower and to output a battery charging status signal;

at least one feedback power transformation module, which is connected with the power collection device and the charging/feedback power output interface, so that through the power collection device being set in contact with the power buses for the vehicle carrying platforms of the parking tower that are moved to the predetermined parking positions, electric power from the battery of the electric vehicle on the vehicle carrying platforms of the parking tower that is connected with the charging/feedback power output interface is converted by the feedback power transformation module into feedback power to be fed through the power collection device and the power buses into the electric power control unit;

at least one bidirectional electric power switch controller, which is connected with the charging power transformation module, the feedback power transformation module, and the charging/feedback power output interface in order to control switching of output of the charging power output from the charging power transformation module and the feedback power output from the feedback power transformation module, the bidirectional electric power switch controller converting the battery charging status signal of the battery of the electric vehicle on the vehicle carrying platforms of the parking tower detected by the charging/feedback power output interface into battery charging status data for output;

at least one communication interface, which is connected with the bidirectional electric power switch controller and the electric vehicle charging management center to output the battery charging status data to the electric vehicle charging management center and to receive the remote monitor instruction from the electric vehicle charging management center in order to feed the remote monitor instruction of the electric vehicle charging management center to the bidirectional electric power switch controller to serve as basis for the bidirectional electric power switch controller to control the switching of output of the charging power output from the charging power transformation module and the feedback power output from the feedback power transformation module; and at least one power supply device, which is connected with the charging power transformation module, the charging/feedback power output interface, the feedback power transformation module, the bidirectional electric power switch controller, and the communication interface to supply working power required by the charging power transformation module, the charging/feedback power output interface, the feedback power transformation module, the bidirectional electric power switch controller, and the communication interface.

In the electric vehicle parking energy supply system of the present invention, the charging/feedback power output interface of the power charging control unit is connected to a socket panel to allow the battery of the electric vehicle on the vehicle carrying platforms of the parking tower to connect through at least one power supply cable with the socket panel.

In the electric vehicle parking energy supply system of the present invention, the charging/feedback power output interface of the power charging control unit is connected through at least one charging cable with at least one intelligent battery charging controller in the electric vehicle parked on the vehicle carrying platforms of the parking tower, the intelligent battery charging controller being connected with the at least one battery inside the electric vehicle.

In the electric vehicle parking energy supply system of the present invention, the bidirectional electric power switch controller of the power charging control unit is connected with at least one power collection device driver, the power collection device driver being connected with the charging power transformation module and the power collection device with which the feedback power transformation module is connected, so that the power collection device driver controls and drives the power collection device to move downward for contacting with or to move upward for detaching from the power buses.

In the electric vehicle parking energy supply system of the present invention, the power collection device driver with which the bidirectional electric power switch controller is connected is formed of a servo motor.

In the electric vehicle parking energy supply system of the present invention, the power collection device of the power charging control unit is formed of a T-shaped power collection bow.

In the electric vehicle parking energy supply system of the present invention, the power collection device of the power charging control unit comprises an insulation cover arranged to cover a surface thereof and is also provided, at one end thereof, with a power connection terminal for contacting a surface of the power buses.

In the electric vehicle parking energy supply system of the present invention, the communication interface of the power charging control unit is formed of a wireless communication interface in order to connect, through at least one wireless network, with the electric vehicle charging management center.

In the electric vehicle parking energy supply system of the present invention, the communication interface of the power charging control unit is connected with at least one network camera, the network camera being operable to picture live images of battery charging and parking operation of the battery of the electric vehicle on the vehicle carrying platforms of the parking tower for output through the communication interface.

In the electric vehicle parking energy supply system of the present invention, the power supply device of the power charging control unit is formed of a chargeable battery.

In the electric vehicle parking energy supply system of the present invention, the electric vehicle charging management center is connected with at least one man-machine control interface, the man-machine control interface being operable to allow a user to input and inquire identification of an electric vehicle parked on one of the vehicle carrying platforms of the parking tower and data and status of charging of a battery of the electric vehicle, and to enable calculation and payment of parking fee and charging fee of the electric vehicle The effectiveness of the electric vehicle parking energy supply system of the present invention is that the power charging control unit is connected to at least one power generation system and is not limited to one single commercial power supply, having a simple structure and being easy to operate, and occupying additional area for installation; for the power generation system being a fuel cell power generation system arrangement can be made in any area where fuel gas pipeline or liquidized natural gas tank truck may reach, such as sites in urban areas where a huge number of parking spaces are required, such as supermarkets, communities, malls, shopping centers, and airports, or at sites of gas stations, supermarkets, and harbors at remote areas so that the system can be made popularly installed in urban area where power supply is in shortage or in far areas where no power supply is available; the power control unit and each charging control unit of the parking tower can be used for bidirectional operation of electric energy so as to allow the electric vehicles parked on the vehicle carrying platforms of the parking tower to park and charge for a short term or a long term to thereby alleviate parking and charging issues of electric vehicles; in case of severe power shortage in the urban areas or far areas where the system is installed or emergency power supply being required in case of failure of external power supply to the parking tower, the electric vehicle charging management center may remotely issue, through a remote monitor instruction fed through a wireless network, a remote monitor command to the power control unit and the charging control unit of each vehicle carrying platform so as to feed the electric power from the power generation system and electric power from the battery of the electric vehicles parked on each vehicle carrying platform for charging in an extended period of time through the power buses to the electric power control unit to be converted into feedback power for supplying to the commercial power supply as emergency backup power supply or emergency operation power for the parking tower so that the parking tower that receive electric vehicles to park and charge no longer be a huge loading of a power system and can serve as emergency backup power for urban areas where a huge number of parking spaces are required, such as supermarkets, communities, malls, shopping centers, and airports, or at sites of gas stations, supermarkets, and harbors at remote areas and the electric power from all the batteries of the electric vehicles in the parking tower and that from the power generation system can be supplied for emergency cases such as for solving seasonal power shortage in the summertime that might lead to total failure of power supply. All these are not available in the prior art systems. In addition, the system of the present invention requires not backup power supply and its own is a power storage device of a huge capacity so that in power interruption of mechanical operation or control system of the parking tower, the electric power from all the batteries of the electric vehicles in the parking tower and that from the power generation system can be supplied as regular power supply for an extended period of time, so as to achieve an effect of green and air pollution free energy supply for emergency. The installation cost of the parking tower facility can be saved and utilization of electric energy is enhanced so as to provide a vast economic value for industrial use. In addition, the power collection device of the charging control unit and the power buses are put in face-to-face contact so that potential risk of incorrect contact or shorting caused by positional error of the vehicle carrying platform set at a predetermined location, so that all the drawbacks of the prior art can be overcome. The power collection device can be controlled for contacting or detaching with respect to the power buses through being controlled by a power collection device driver controlled by the charging control unit so that regular gasoline-driven vehicles can be parked, in a mixed manner, on the vehicle carrying platforms of the parking tower without cause any concern of safety.

BRIEF DESCRIPTION OF THE DRAWINGS

A better understanding of the present invention will be available through reading of a detailed description provided below with reference to the attached drawings that illustrate preferred embodiments of the present invention. In the drawings.

DETAILED DESCRIPTION OF THE PREFERRED EMBODIMENTS

Figure 1:
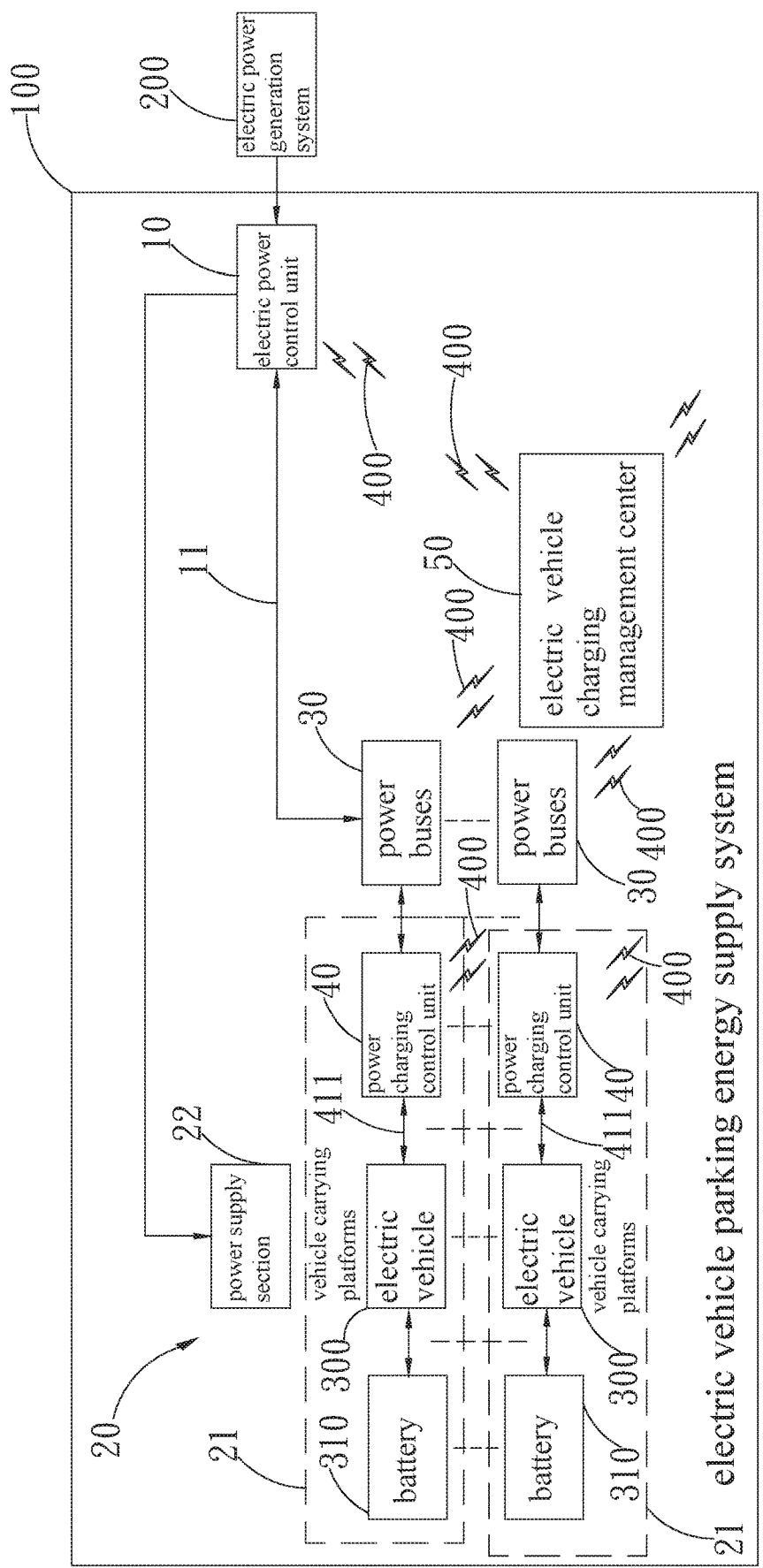
FIG. 1 is a block diagram showing an electric vehicle parking energy supply system constructed in accordance with a first embodiment of the present invention.
Figure 2:
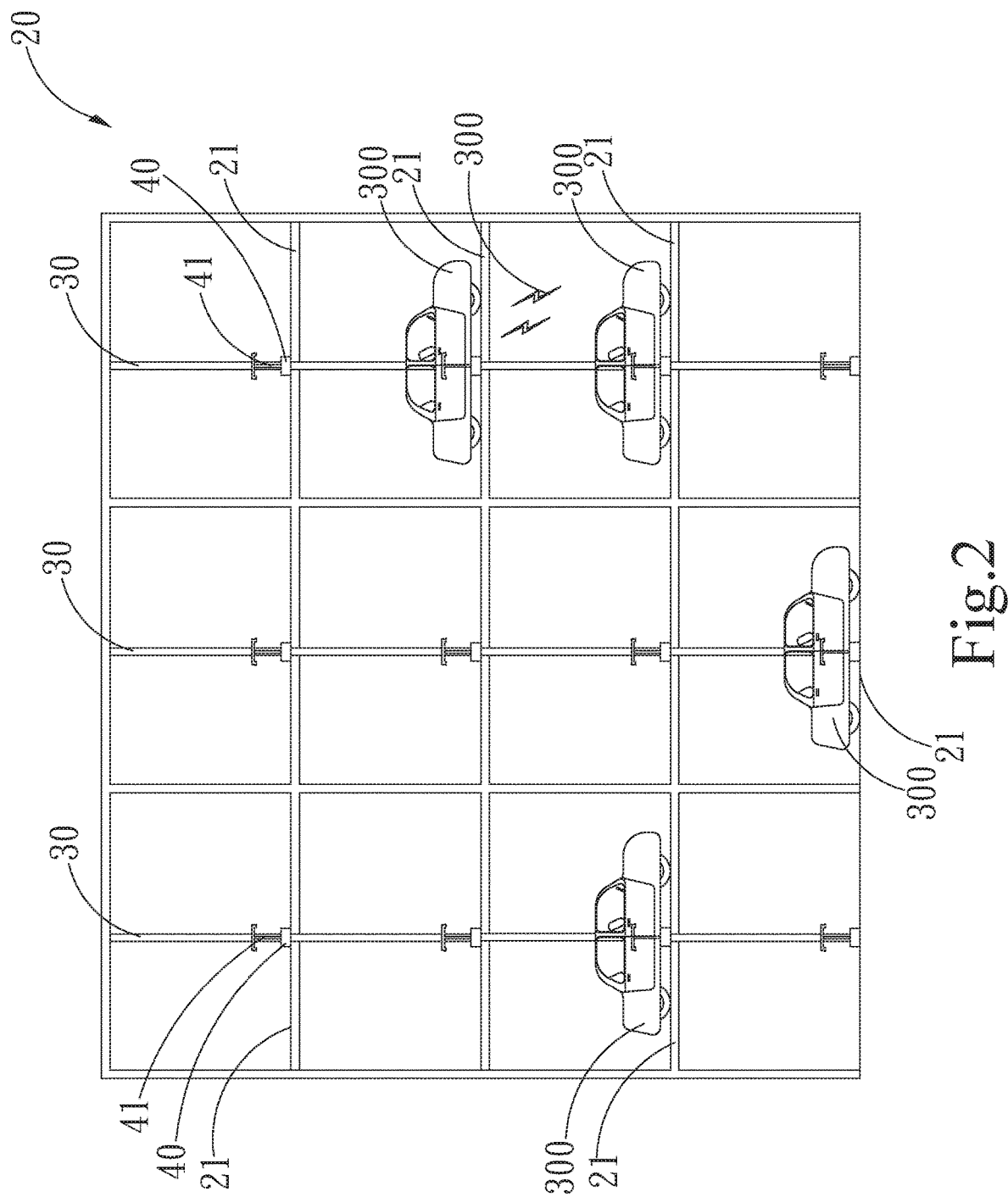
FIG. 2 is a front view illustrating a condition in which vehicle carrying platforms of a parking tower according to the present invention receive electric vehicle to park thereon for charging.

Referring to FIG. 1, a first embodiment of an electric vehicle parking energy supply system 100 according to the present invention is shown, wherein the electric vehicle parking energy supply system 100 comprises at least one electric power control unit 10. The electric power control unit 10 is connected with at least one electric power generation system 200. The electric power control unit 10 has a bidirectional supply control function for multiple electric energies. The electric power control unit 10 receives electric power supplied from the electric power generation system 200 for conversion into an output power 11 for output. The electric power generation system 200 is not limited to any specific type, and Solid Oxide Fuel Cell (SOFC) of the BlueGen series product of Italian manufacturer SolidPower is taken as an example of the electric power generation system.

Referring to FIGS. 2, 3, 4, and 5, at least one parking tower 20 is provided. The parking tower 20 includes a plurality of vehicle carrying platforms 21 that are each movable in multiples axes for receiving an electric vehicle 300 to park thereon. The parking tower 20 is provided with a power supply section 22. The power supply section 22 is connected with the electric power control unit 10 to receive the output power 11 output from the electric power control unit 10 as electric power for operations of each of vehicle carrying platforms 21 of the parking tower 20 for movement and vehicle parking. The electric vehicle 300 is not limited to electric automobiles and can be electric motorcycles or other electric vehicles.

A plurality of the power buses 30 are provided and are arranged longitudinally to each correspond to one side of a predetermined location of each of the vehicle carrying platforms 21 of the parking tower 20 and are connected with the electric power control unit 10 to serve as an electric energy bidirectional supply channel of the electric power control unit 10.

Figure 3:
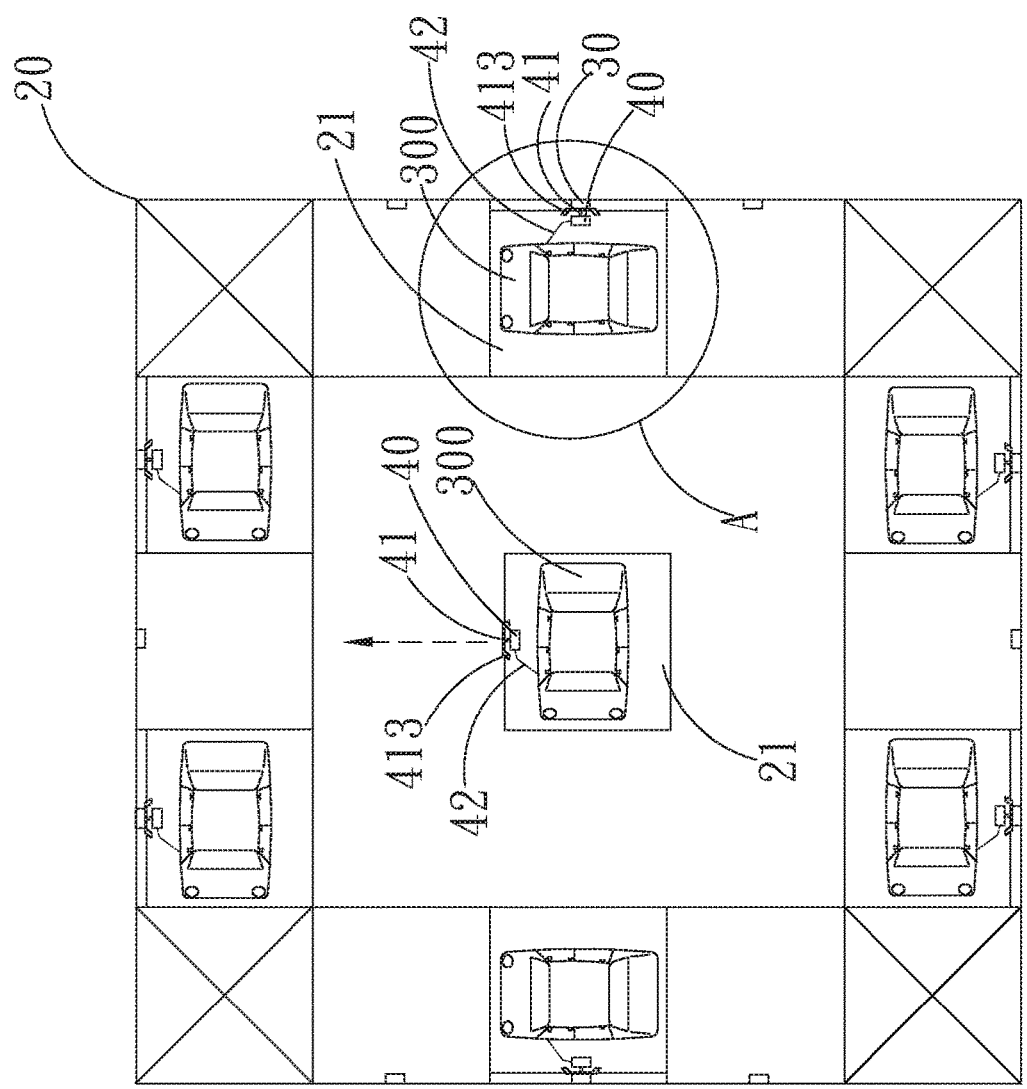
FIG. 3 is a top view illustrating a condition in which the vehicle carrying platforms of the parking tower according to the present invention are moving and enabling the electric vehicle parked thereon to charge.
Figure 4:
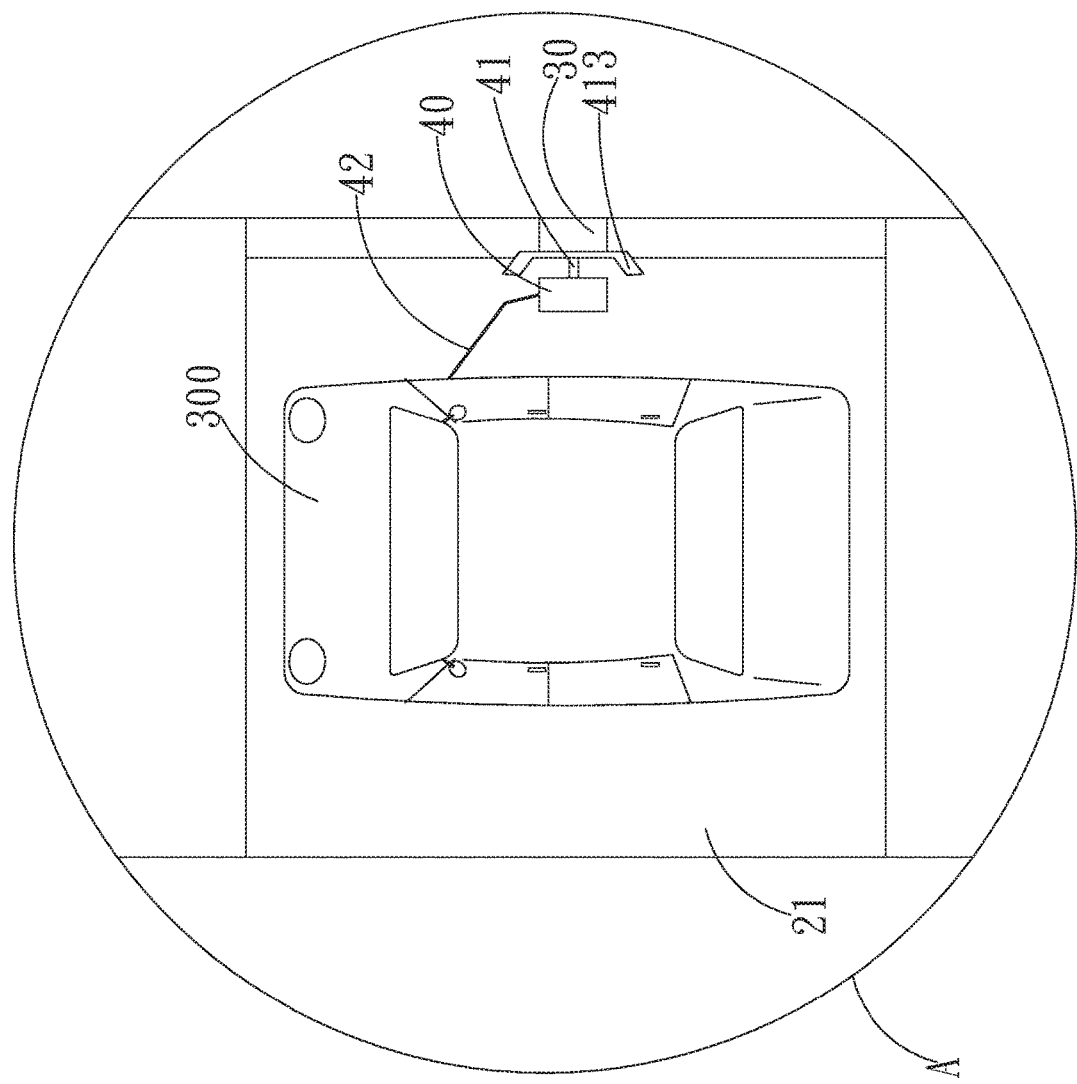
FIG. 4 is an enlarged view showing an encircled portion A of FIG. 3, illustrating a condition in which the electric vehicle parked on the vehicle carrying platforms of the parking tower according to the present invention is charged.
Figure 5:
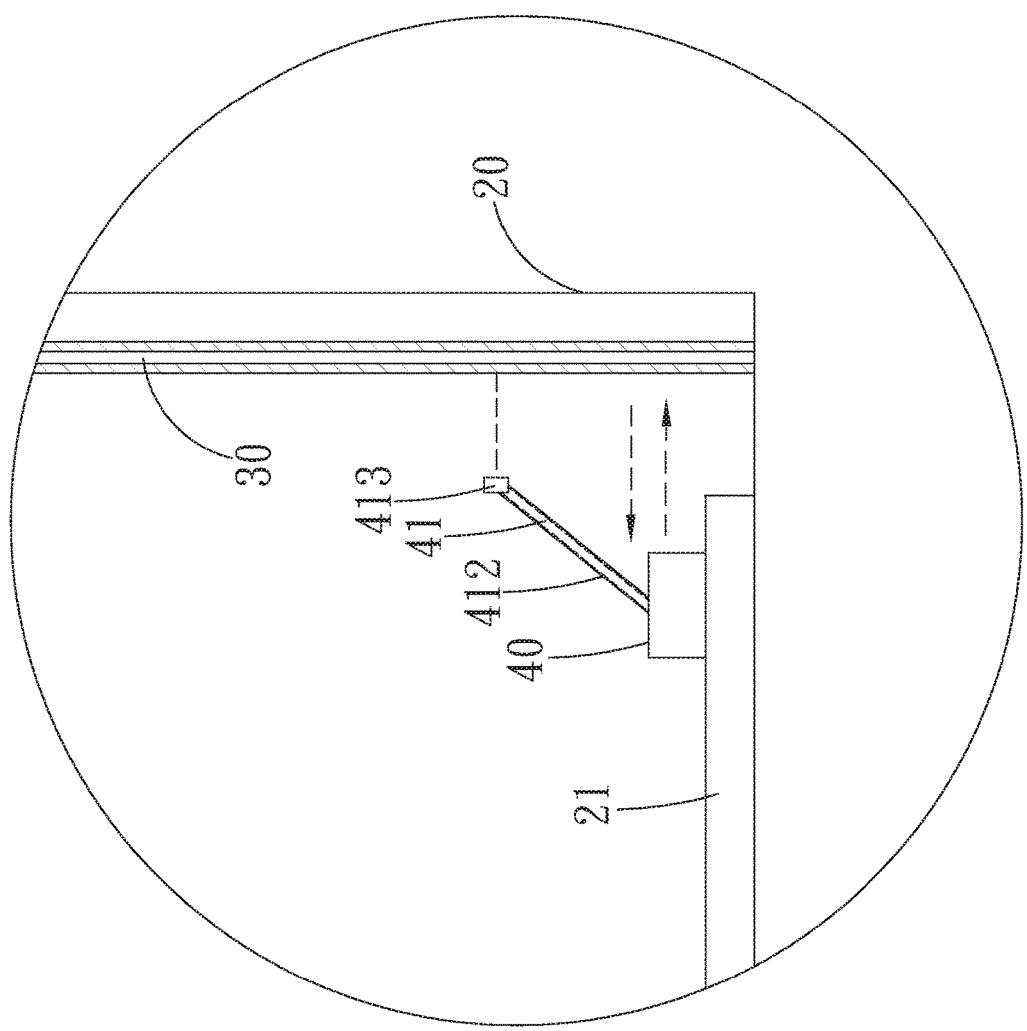
FIG. 5 is a side elevational view of a portion of the present invention, in an enlarged form, illustrating a condition in which a power collection device of a power charging control unit is set in conductive contact with a power bus through movement of the vehicle carrying platforms according to the present invention.

At least one power charging control unit 40 is provided. Each power charging control unit 40 is provided with at least one power collection device 41. The power collection device 41 is contactable and in electric conduction with the power buses 30 when the vehicle carrying platforms 21 are moved to predetermined parking locations (as shown in FIGS. 3, 4, and 5), and the power charging control unit 40 is connected through a power supply cable 42 (as shown in FIG. 4) with the electric vehicle 300 to supply a charging power source 411 to a battery 310 inside the electric vehicle 300 (as shown in FIG. 1) for charging, wherein an operation process is that the electric vehicle 300 stops at an entrance and parked on the vehicle carrying platform 21 on the bottommost level of the parking tower 20 (not shown) to allow passengers to get off and then, the power supply cable 42 is put into connection between the electric vehicle 300 and the power charging control unit 40. The user may then leave and the parking tower 20 controls the vehicle carrying platform 21 on which the electric vehicle 300 is parked to move to a predetermined parking location of the parking tower 20. Further, the power charging control unit 40 may make the electric power of at least one battery 310 of each electric vehicle 300 as at least one feedback power source 40A that is fed through the power buses 30 into the electric power control unit 10 to be then converted by the electric power control unit 10 into return-back power 40B for output. The power charging control unit 40 includes a function of detecting a charging status of the battery 310 of the electric vehicle 300 and outputting a battery charging status data 40C.

The power collection device 41 is not limited to any specific type, and in this invention, a T-shaped power collection bow is taken as an example. The power collection device 41 has a surface that is covered with an insulation cover 412 (as shown in FIG. 3) and is provided, at one end thereof, with a power connection terminal 413 for contacting, in a face-to-face manner, with a surface of the power buses 30.

At least one electric vehicle charging management center 50 is provided and is each connected with the electric power control unit 10 and each power charging control unit 40 so that the electric vehicle charging management center 50 may remotely control and monitor, through remote network connection, bidirectional energy supply of the electric power control unit 10 and the charging status of the electric vehicle 300 connected to each power charging control unit 40 according to the output power 11 output from the electric power control unit 10 and the battery charging status data 40C of each power charging control unit 40. The connection of the electric vehicle charging management center 50 with the electric power control unit 10 and each power charging control unit 40 is not limited to any specific type, and in this invention, connection made through a wireless network 400 is taken as an example, or alternatively, the connection can be made through the internet or at least one local area network (LAN).

Figure 6:
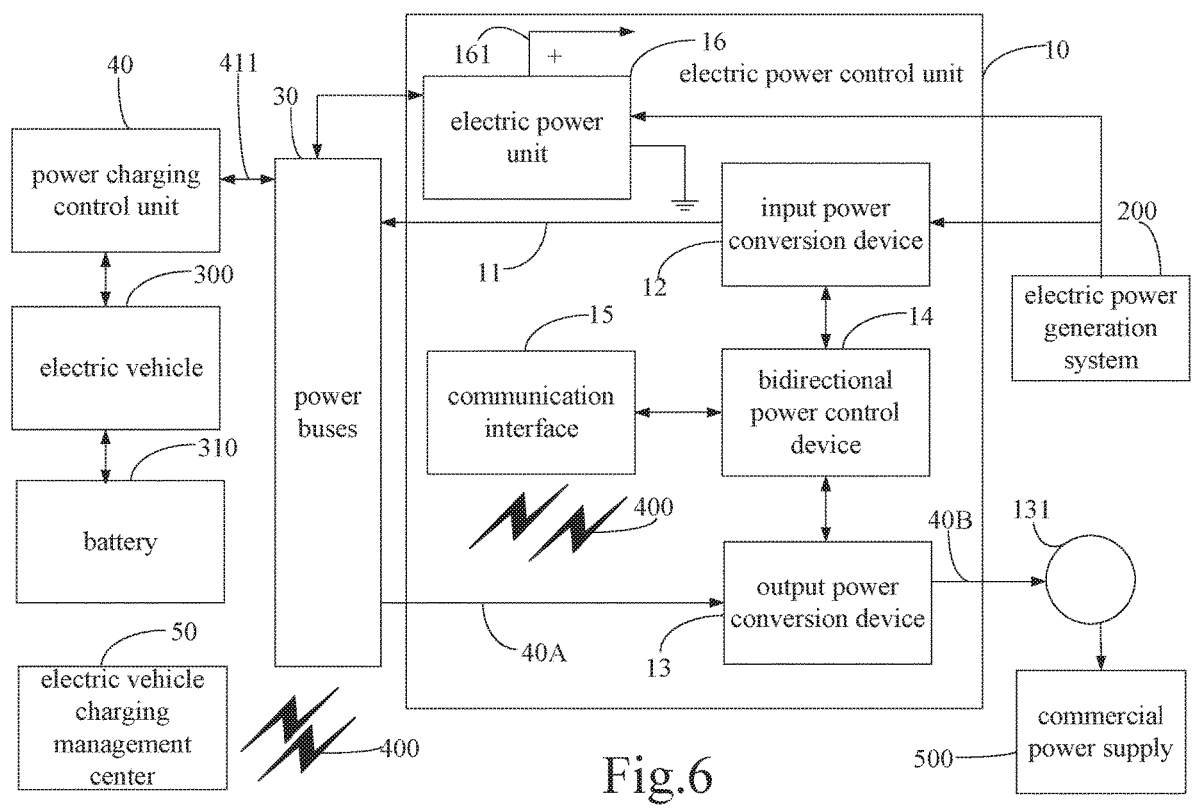
FIG. 6 illustrates an electric vehicle parking energy supply system according to a second embodiment of the present invention.

Referring to FIG. 6, a second embodiment of the electric vehicle parking energy supply system 100 according to the present invention is shown, wherein the electric power control unit 10 shown is not limited to any specific type, and in the second embodiment of this invention, an arrangement that comprises at least one input power conversion device 12, at least one output power conversion device 13, at least one bidirectional power control device 14, at least one communication interface 15, and at least one electric power unit 16 is taken as an example. The input power conversion device 12 is connected with the electric power generation system 200 and the power buses 30. The input power conversion device 12 receives electric power from the electric power generation system 200 for conversion into output power 11 for outputting to the power buses 30.

The output power conversion device 13 is connected with the power buses 30 and the electric power generation system 200, such that electric power from the at least one battery 310 of the electric vehicle 300 that is connected with the power charging control unit 40 arranged on each vehicle carrying platforms 21 or a portion of the electric power generated by the electric power generation system 200 is fed through the power charging control unit 40 and the power buses 30 into the output power conversion device 13 in order to convert the electric power of the at least one battery 310 of the electric vehicle 300 connected with each power charging control unit 40 into return-back power 40B for output. The output power conversion device 13 is also connected with at least one intelligent electric meter 131. The intelligent electric meter 131 is connected with at least one commercial power supply 500, so that the return-back power 40B output from the output power conversion device 13 can be sold through the intelligent electric meter 131 back to the commercial power supply 500.

The bidirectional power control device 14 is connected with the input power conversion device 12 and the output power conversion device 13 to control timing of output of the output power 11 of the input power conversion device 12 and the return-back power 40B of the output power conversion device 13.

The communication interface 15 is connected with the bidirectional power control device 14 and the electric vehicle charging management center 50 to receive a remote monitor instruction of the electric vehicle charging management center 50 to feed the remote monitor instruction of the electric vehicle charging management center 50 to the bidirectional power control device 14 to serve as basis for the bidirectional power control device 14 to control the timing of output of the output power 11 of the input power conversion device 12 and the return-back power 40B of the output power conversion device 13. The communication interface 15 is not limited to any specific type, and in this invention, a wireless communication interface is taken as an example to allow the communication interface 15 to be connected through the wireless network 400 with the electric vehicle charging management center 50.

The electric power unit 16 is connected with the electric power generation system 200, the power buses 30, the input power conversion device 12, the output power conversion device 13, the bidirectional power control device 14, and the communication interface 15, in order to convert the electric power generated by the electric power generation system 200 or the electric power from the at least one battery 310 of the electric vehicle 300 connected with at least one power charging control unit 40 of at least one power bus 30 into at least one portion of working power 161 that is fed to the input power conversion device 12, the output power conversion device 13, the bidirectional power control device 14, and the communication interface 15.

Figure 7:
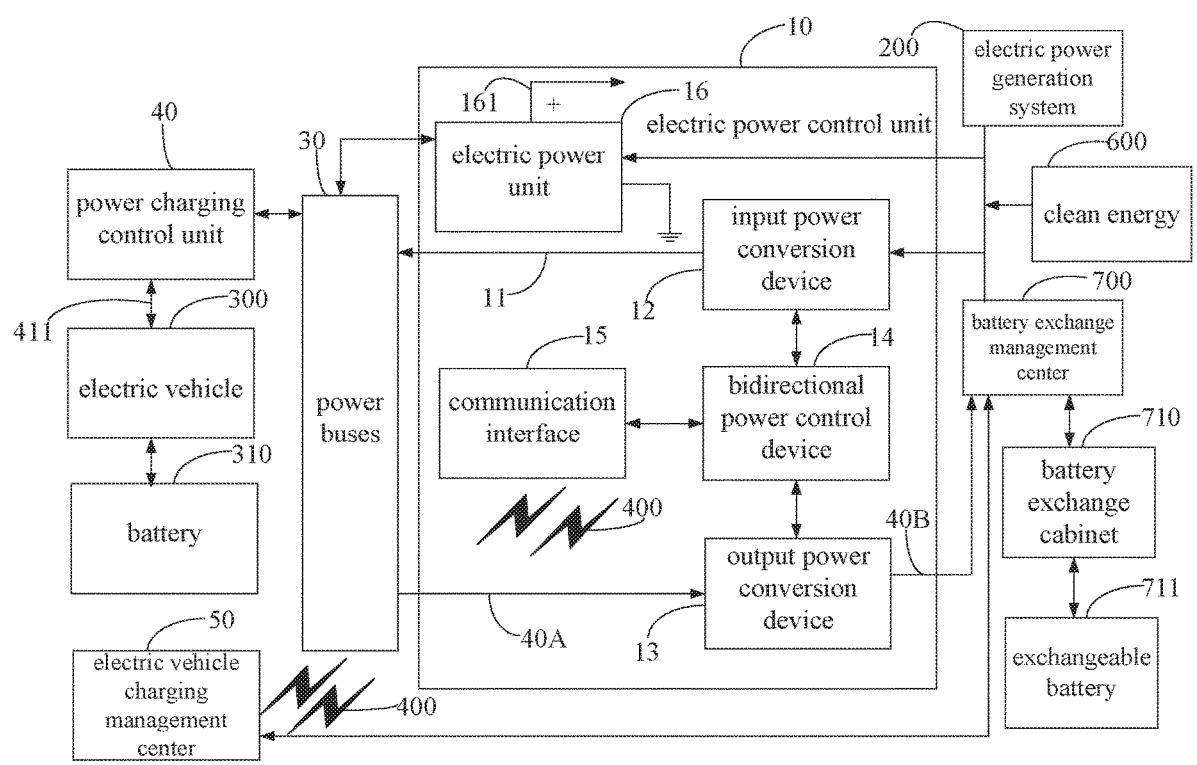
FIG. 7 illustrates an electric vehicle parking energy supply system according to a third embodiment of the present invention.

Referring to FIG. 7, a third embodiment of the electric vehicle parking energy supply system 100 according to the present invention is shown, wherein the input power conversion device 12 of the electric power control unit 10 is connected with at least one source of clean energy 600. The clean energy 600 is not limited to any specific type, and can be any green, clean, and low-pollution electricity that is supplied as electric power generated through solar energy, electric power provided through wind power generation, electric power generated with fuel cells, electric power generated with geothermal power generation, or independent battery exchange cabinet, which is used in combination with the electric power generation system 200 as an input of electric power to the electric power control unit 1, and the output power conversion device 13 of the electric power control unit 10 is connected with the electric power generation system 200 to convert a portion of the electric power generated by the electric power generation system 200 into return-back power 40B for output, and the input power conversion device 12 and the output power conversion device 13 of the electric power control unit 10 are connected with at least one battery exchange management center 700, and the battery exchange management center 700 is further connected with at least one battery exchange cabinet 710 and the electric vehicle charging management center 50, in order to receive the remote monitor instruction of the electric vehicle charging management center 50 to supply return-back power 40B output from the output power conversion device 13 of the electric power control unit 40 to each exchangeable battery 711 in the battery exchange cabinet 710 as charging power, or the battery exchange cabinet 710 feeds the electric power of each exchangeable battery 711 in the battery exchange cabinet 710 back to the input power conversion device 12 of the electric power control unit 10 to serve as one of back-up power sources of the electric power control unit 10.

Figure 8:
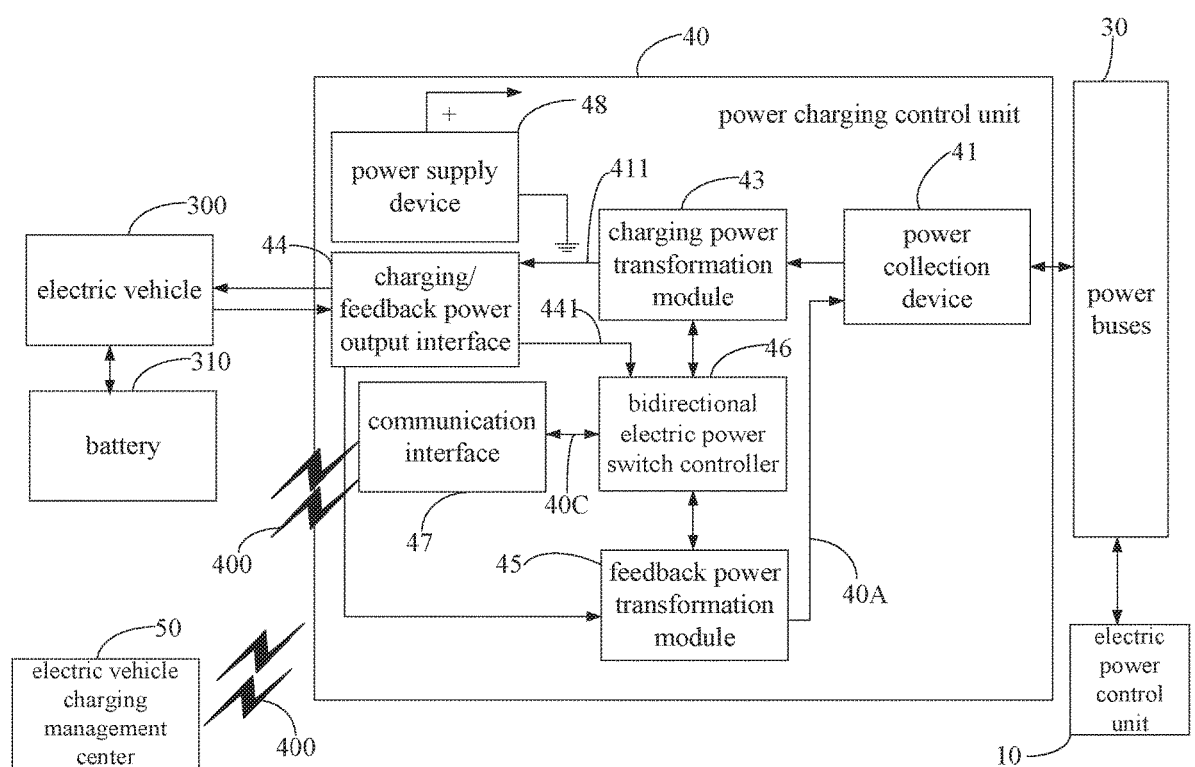
FIG. 8 illustrates an electric vehicle parking energy supply system according to a fourth embodiment of the present invention.

Referring to FIG. 8, a fourth embodiment of the electric vehicle parking energy supply system 100 according to the present invention is shown, wherein the power charging control unit 40 is not limited to any specific type, and in this invention, an arrangement that comprises at least one charging power transformation module 43, at least one charging/feedback power output interface 44, at least one feedback power transformation module 45, at least one bidirectional electric power switch controller 46, at least one communication interface 47, and at least one power supply device 48 is taken as an example. The charging power transformation module 43 is connected with the power collection device 41, such that, through contact of the power collection device 41 with the power buses 30 when the vehicle carrying platforms 21 of the parking tower 20 are moved to predetermined parking positions, the charging power transformation module 43 receives the output power 11 output from the electric power control unit 10 to be converted into charging power 411 for output.

The charging/feedback power output interface 44 is connected with the charging power transformation module 43 and the battery 310 of the electric vehicle 300 on the vehicle carrying platforms 21 of the parking tower 20, in order to feed the charging power 411 converted and output from the charging power transformation module 43 into the battery 310 of the electric vehicle 300 for charging. The charging/feedback power output interface 44 may detect the charging status of the battery 310 of the electric vehicle 300 on the vehicle carrying platforms 21 of the parking tower 20 and outputs a battery charging status signal 441.

The feedback power transformation module 45 is connected with the power collection device 41 and the charging/feedback power output interface 44, such that through contact of the power collection device 41 with the power buses 30 when the vehicle carrying platforms 21 of the parking tower 20 are moved to predetermined parking positions, electric power of the battery 310 of the electric vehicle 300 on the vehicle carrying platforms 21 of the parking tower 20 that is connected with the charging/feedback power output interface 44 is converted by the feedback power transformation module 45 into feedback power 40A, which is fed through the power collection device 41 and the power buses 30 into the electric power control unit 10.

The bidirectional electric power switch controller 46 is connected with the charging power transformation module 43, the feedback power transformation module 45, and the charging/feedback power output interface 44, in order to control switching of output of the charging power 411 from the charging power transformation module 43 or the feedback power 40A from the feedback power transformation module 45, and the bidirectional electric power switch controller 46 converts the battery charging status signal 441 of the battery 310 of the electric vehicle 300 on the vehicle carrying platforms 21 of the parking tower 20 detected by the charging/feedback power output interface 44 into battery charging status data 40C for output.

The communication interface 47 is connected with the bidirectional electric power switch controller 46 and the electric vehicle charging management center 50 to output the battery charging status data 40C to the electric vehicle charging management center 50 and to receive the remote monitor instruction of the electric vehicle charging management center 50 in order to feed the remote monitor instruction of the electric vehicle charging management center 50 to the bidirectional electric power switch controller 46 to serve as basis for the bidirectional electric power switch controller 46 to switch timing of output of the charging power 411 from the charging power transformation module 43 or the feedback power 40A from the feedback power transformation module 45. The communication interface 47 is not limited to any specific type, and in this invention, a wireless communication interface is taken as an example to allow connection to be made through the wireless network 400 with the electric vehicle charging management center 50.

The power supply device 48 is connected with the charging power transformation module 43, the charging/feedback power output interface 44, the feedback power transformation module 45, the bidirectional electric power switch controller 46, and the communication interface 47 to supply the charging power transformation module 43, the charging/feedback power output interface 44, the feedback power transformation module 45, the bidirectional electric power switch controller 46, and the communication interface 47 with necessary working power.

Figure 9:
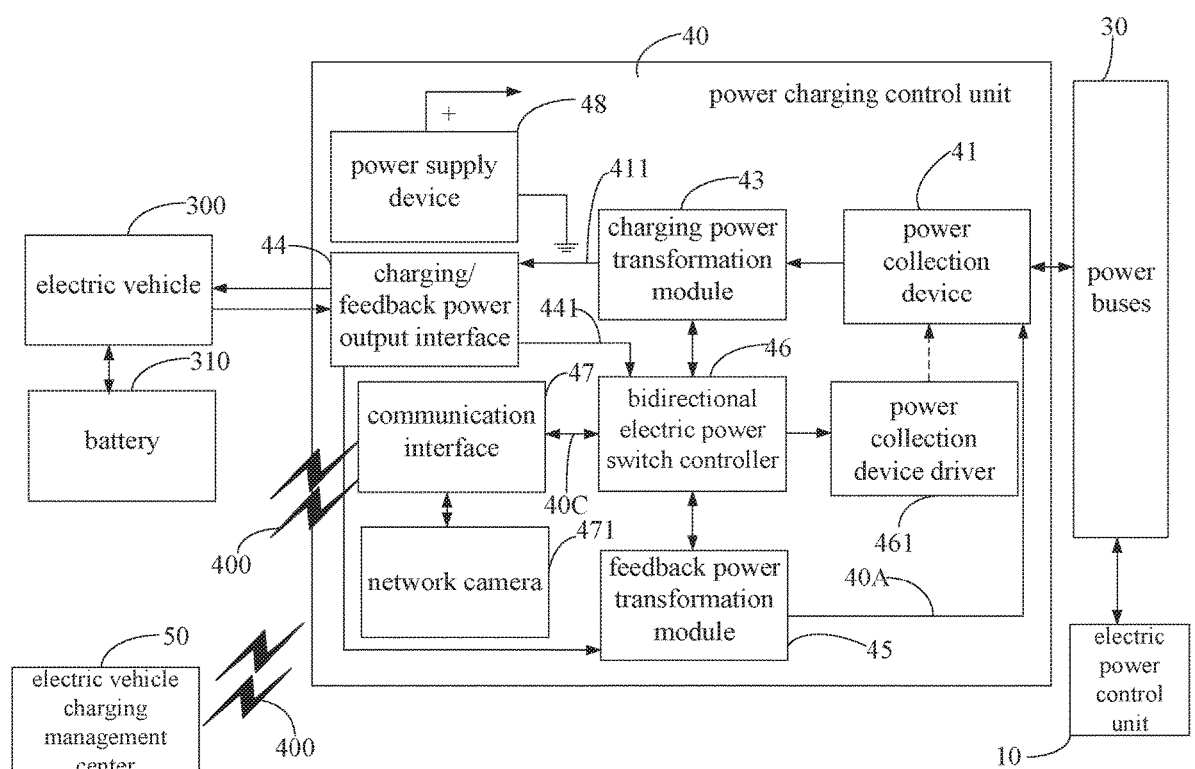
FIG. 9 illustrates an electric vehicle parking energy supply system according to a fifth embodiment of the present invention.
Figure 10:
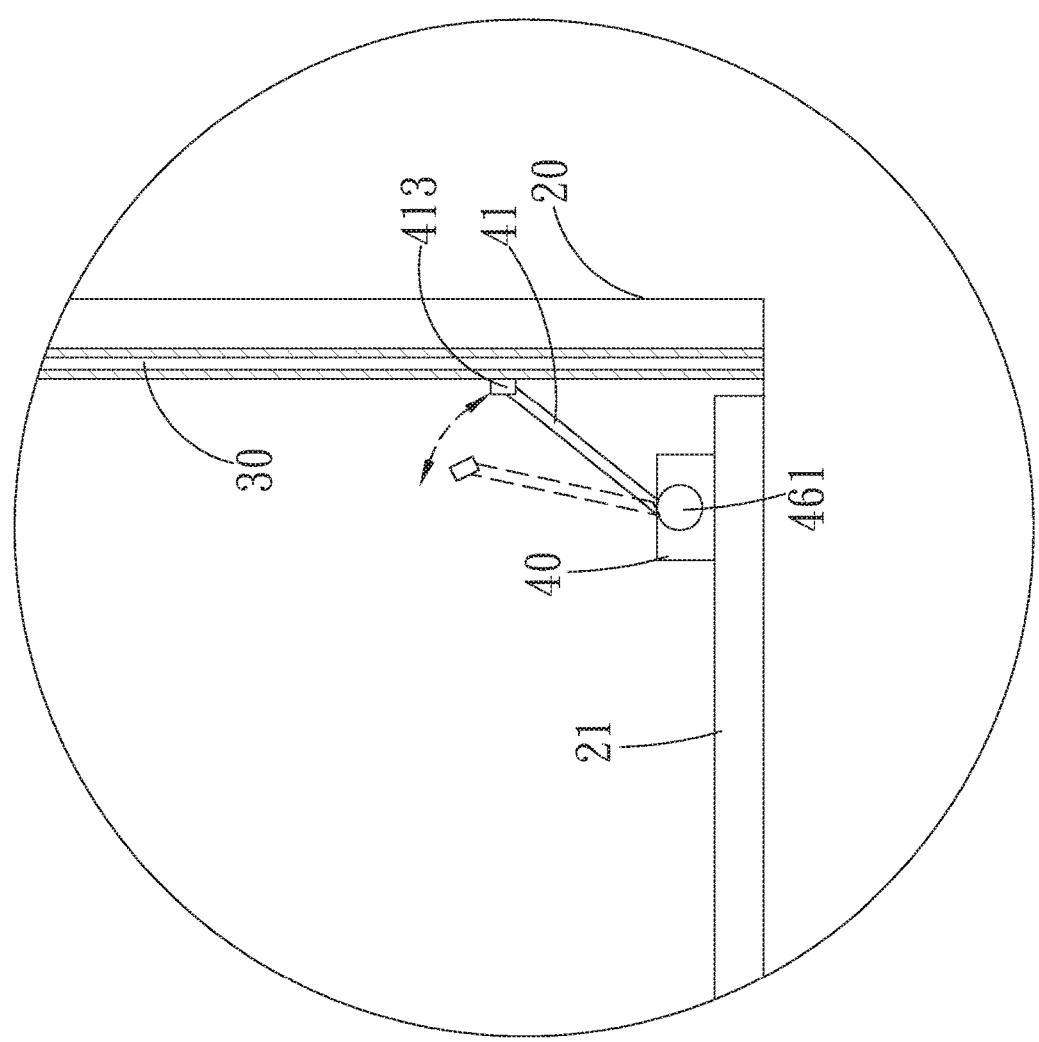
FIG. 10 is a side elevational view of a portion of the present invention, in an enlarged form, illustrating a condition in which the power collection device of the power charging control unit is driven by a power collection device driver to contact with or detach from the power bus according to the present invention.
Figure 11:
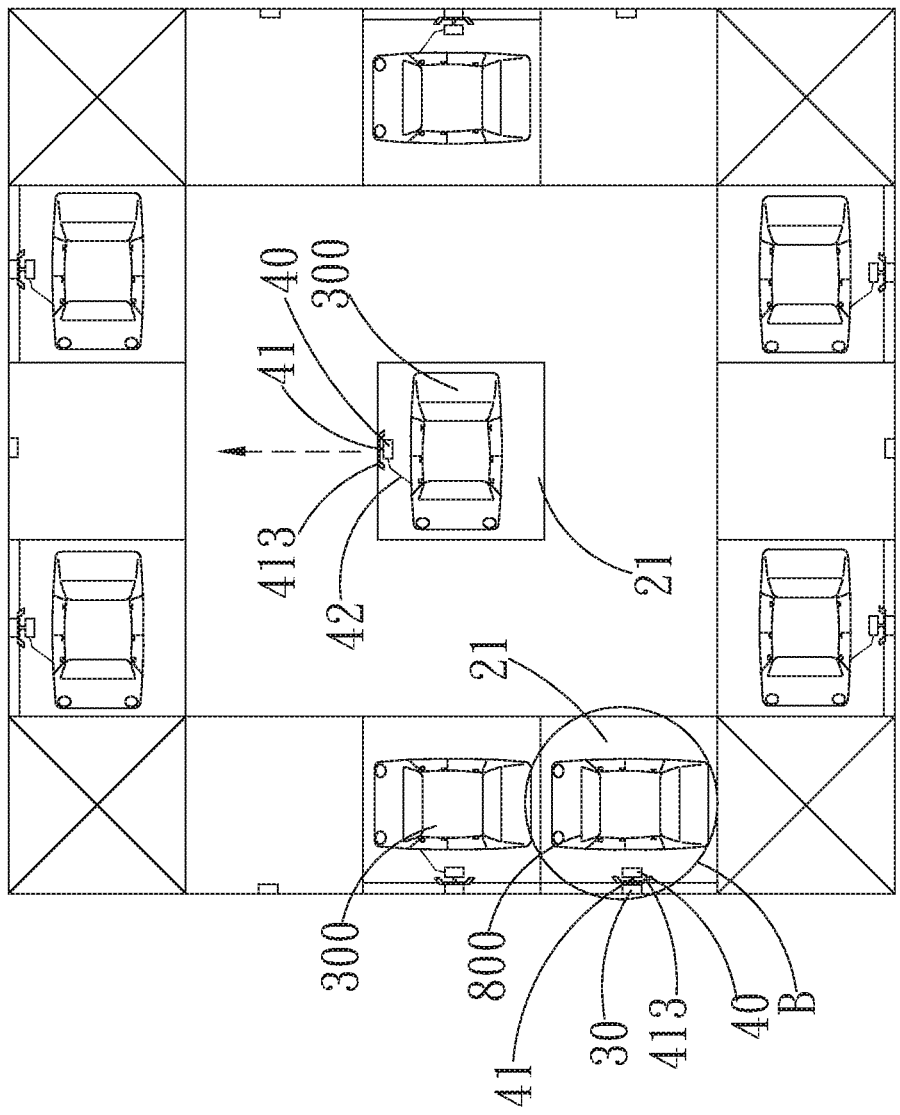
FIG. 11 is a top view illustrating a condition in which the vehicle carrying platforms of the parking tower according to the present invention receive electric vehicles and non-electric vehicles to be parked thereon in a mixed manner.
Figure 12:
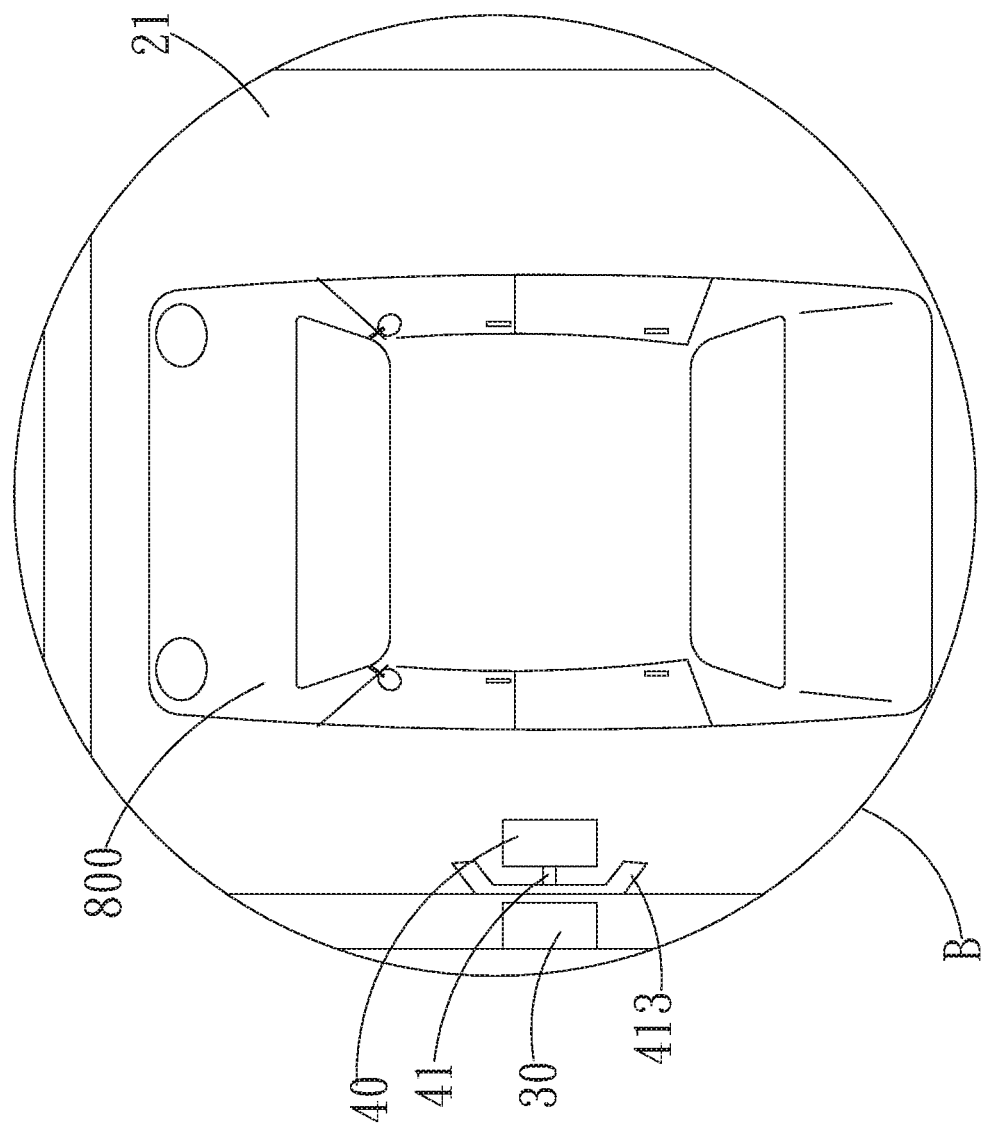
FIG. 12 is an enlarged view showing an encircled portion B of FIG. 11, illustrating a condition in which the vehicle carrying platforms of the parking tower according to the present invention receive non-electric vehicles to park thereon.

Referring to FIGS. 9, 10, 11, and 12, a fifth embodiment of the electric vehicle parking energy supply system 100 according to the present invention is shown, wherein the charging/feedback power output interface 44 of the power charging control unit 40 is connected with a socket panel 442, and the battery 310 of the electric vehicle 300 on the vehicle carrying platforms 21 of the parking tower 20 is connectable through a power supply cable 42 with the socket panel 442. The bidirectional electric power switch controller 46 of the power charging control unit 40 is connected with at least one power collection device driver 461. The power collection device driver 461 is connected with the power collection device 41 with which the charging power transformation module 43 and the feedback power transformation module 45 are connected, so that the power collection device driver 461 may control and drive the power collection device 41 to move downward for contacting, or moving upward for separating from the power buses 30 (as shown in FIGS. 10, 11, and 12). The power collection device driver 461 is not limited to any specific type, and in this invention, a servo motor is taken as an example. In other words, the power collection device driver 461 is operable to control and drive the power collection device 41 to move downward for contacting or moving upward for separating from the power buses 30, so that vehicle carrying platforms 21 of the parking tower 20 may accommodate, in a mixed manner, electric vehicles 300 that require charging and non-electric vehicle 800 that does not require charging. For electric vehicles 300 that require charging, the power collection device driver 461 controls and drives the power collection device 41 to move downward to contact the power buses 30, and for those non-electric vehicles 800 that do not require charging (as shown in FIGS. 11 and 12) or those electric vehicles 300 that have been fully charged and wait for moving out of the parking tower 20, the power collection device driver 461 controls and drives the power collection device 41 to move upward for disengaging the contact with the power buses 30 (as shown in FIG. 10) or for separating from the power buses 30. The communication interface 47 of the power charging control unit 40 is connected with at least one network camera 471 (as shown in FIG. 9). The network camera 471 takes, in real time, data of live images of charging and parking operation of the battery 310 of the electric vehicle 300 on the vehicle carrying platforms 21 of the parking tower 20 for output through the communication interface 47, and the power supply device 48 of the power charging control unit 40 is made up of a chargeable battery for supplying working power to the power collection device driver 461 when the power collection device 41 is not in connection with the power buses 30.

Figure 13:
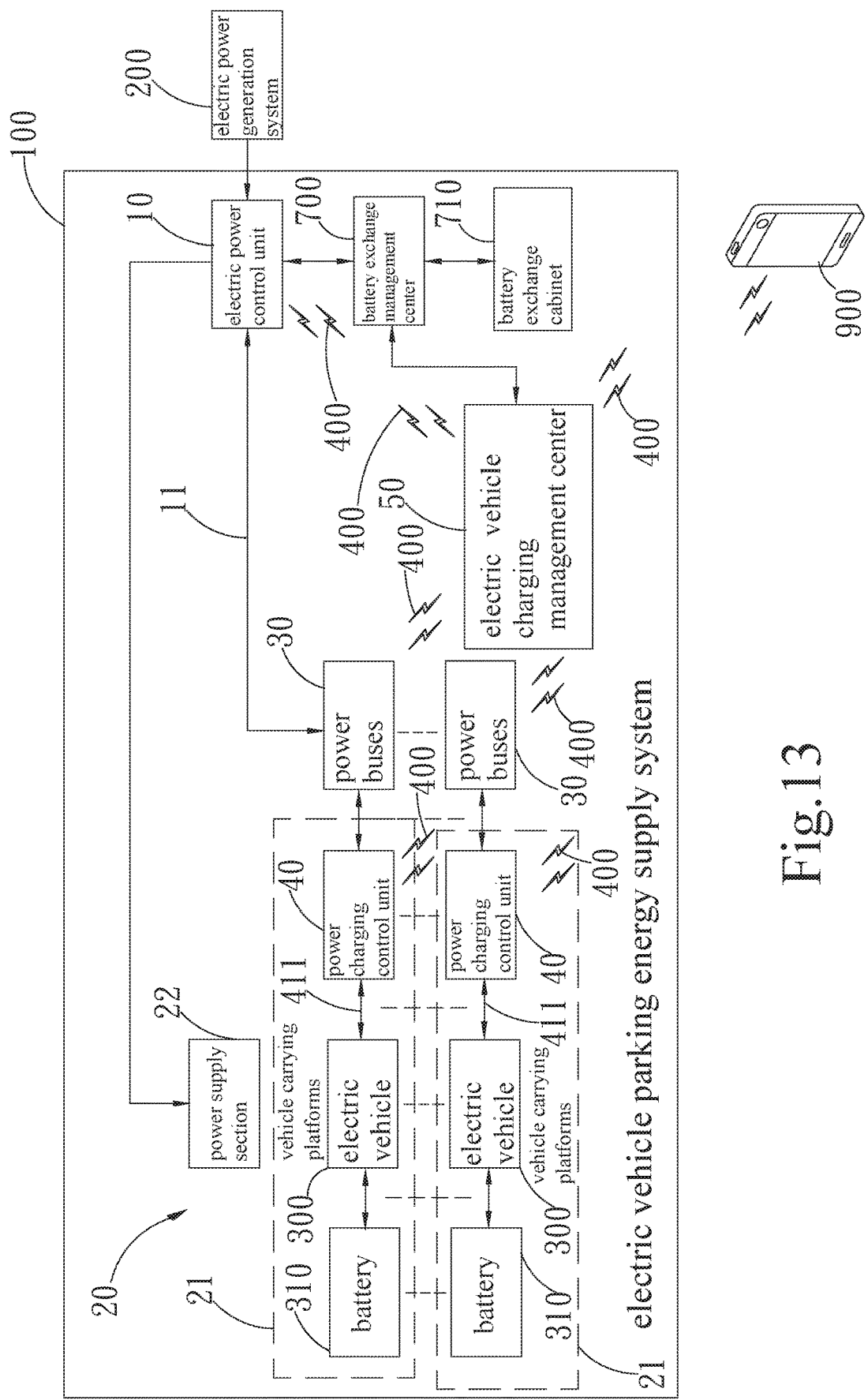
FIG. 13 illustrates a preferred example of application of the electric vehicle parking energy supply system according to the present invention.

Referring to FIG. 13, a preferred example of application of the electric vehicle parking energy supply system 100 according to the present invention is shown, wherein the electric power control unit 10 is connectable with an electric power generation system 200 that can be flexibly installed at sites of urban areas where a huge number of parking spaces are required, such as supermarkets, communities, malls, shopping centers, and airports, or at sites of gas stations, supermarkets, and harbors at remote areas so as not to be affected by constraints of power supply or accidents of power failures occurring in a single one of commercial power supply 500. The electric power control unit 10 may further be connected with clean energy 600, such as electric power generated through solar energy power generation or electric power generated through wind power generation, so that the parking tower 20 is provided with diversified energy resources and utilization involving more eco-friendly and greener energy. The electric vehicle 300 parked on each vehicle carrying platform 21 of the parking tower 20 can be connected, through a power supply cable 42 with the power charging control unit 40, so that an effective and safe operation of power transfer can be achieved in a face-to-face manner between each power collection device 41 and each power bus 30, allowing the power charging control unit 40 to acquire, in a safe and precise manner, charging power 411, in order to proceed with charging of each electric vehicle 300 parked on each vehicle carrying platform 21. Further, the electric power control unit 10 and the power charging control unit 40 both possess a function of controlling bidirectional electric power supply for input and output, in order to feed the electric power supplied from the electric power generation system 200 and the clean energy 600 to the electric power control unit 10 for supplying electric power required for operations of the parking tower 20 and each vehicle carrying platform 21, the working power of the power charging control unit 40, and the charging power 411 required for each electric vehicle 300. Further, when the sites of urban areas where the electric vehicle parking energy supply system 100 of the present invention is built or installed and a huge number of parking spaces are provided, such as supermarkets, communities, malls, shopping centers, and airports, or remote sites of gas stations, supermarkets, and harbors at far areas, suffer insufficiency or no electricity supply from the commercial power supply 500 due to accidental damages or failure of a power supply system of the commercial power supply 500, the electric vehicle charging management center 50 may issue, through the wireless network 400, a remote monitor instruction to the electric power control unit 10 and each power charging control unit 40 that is connected with a battery 310 of an electric vehicle 300 that has been parked on the vehicle carrying platforms 21 of the parking tower 20 for an extended period of time for charging such that the electric power of each battery 310 of each electric vehicle 300 fed out through the power charging control units 40, the power buses 30, and the electric power control unit 10 as return-back power 40B to the commercial power supply 500, and, the electric power generation system 200 may, through following the example shown in FIG. 7, be connected with the output power conversion device 13 of the electric power control unit 10 to have electric power generated by the electric power generation system 200 fed into the electric power control unit 10 to be transferred into return-back power 40B, similarly supplied to the commercial power supply 500 as emergency backup power.

Further, the electric vehicle parking energy supply system 100 of the present invention can be operated such that even when the electric power generation system 200 and the clean energy 600 are both shut down for power supply due to breakdown or failure, the example shown in FIG. 7 may be followed by having the electric vehicle charging management center 50 issues a remote monitor instruction to the battery exchange management center 700, making each exchangeable battery 711 of the battery exchange cabinet 710 with which the battery exchange management center 700 is in connection supply, operated in a reversed manner to serve as backup power for the electric power control unit 10, in order to keep the electric vehicle parking energy supply system 100 of the present invention in proper operation and no additional backup power system that is generally expensive and may stay idle for an extremely long period of time is necessary.

Further, in the electric vehicle parking energy supply system 100 according to the present invention, when each electric vehicle 300 on each vehicle carrying platform 21 of the parking tower 20 is placed in a charging status, connection can be established through the wireless network 400 between each power charging control unit 40 and the electric vehicle charging management center 50, and each power charging control unit 40 may transmit, in real time, the battery charging status data 40C of the charging status of the battery 310 of each electric vehicle 300 and data of live images of charging and parking operation taken by each network camera 471 as shown in FIG. 9 to the electric vehicle charging management center 50, so that the electric vehicle charging management center 50 may further transmit the battery charging status data 40C of the charging status of the battery 310 of each electric vehicle 300 and data of live images of charging and parking operation corresponding thereto through the wireless network 400 to at least one intelligent communication device 900 of the user of the electric vehicle 300 for displaying, so that the user may get immediately aware of the real-time charging and parking status of the electric vehicle 300 on the vehicle carrying platforms 21 of the parking tower 20. The way that the electric vehicle charging management center 50 transmits the battery charging status data 40C of the charging status of the battery 310 of the electric vehicle 300 and the data of live images of charging and parking operation through the wireless network 400 to the at least one intelligent communication device 900 of the user of the electric vehicle 300, the vehicle carrying platforms 21, parking and charging identification recognition of the electric vehicle 300 is not limited to any specific form, and in this invention, the intelligent communication device 900 and wireless network application software (APP) are taken as an example.

Figure 14:
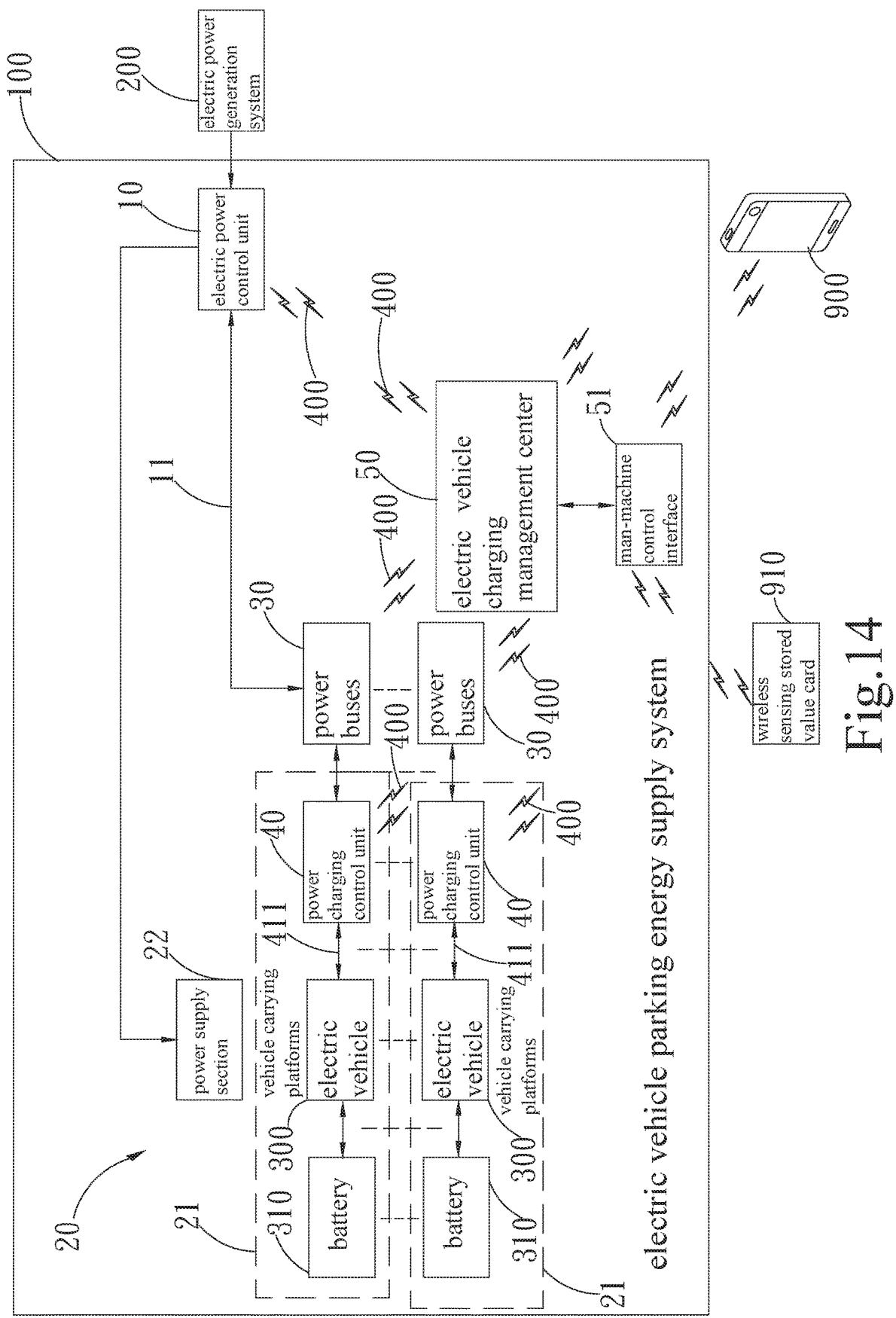
FIG. 14 illustrates an electric vehicle parking energy supply system according to a sixth embodiment of the present invention.

Referring to FIG. 14, a sixth embodiment of the electric vehicle parking energy supply system 100 according to the present invention is shown, wherein the electric vehicle charging management center 50 is connected with at least one man-machine control interface 51. The man-machine control interface 51 allows a user to input and inquire the identification data of an electric vehicle 300 parked on each vehicle carrying platform 21 of the parking tower 20 (such as license tag data or membership number of the parking tower 20) and charging data and status of the battery 310 of the electric vehicle 300, and calculation and payment of parking fee and charging fee of the electric vehicle 300. The way of using the man-machine control interface 51 to input or inquire the identification data of an electric vehicle 300 parked on the vehicle carrying platform 21 of the parking tower 20, the charging data and status of the battery 310 of the electric vehicle 300, or the calculation and payment of the parking fee and the charging fee of the electric vehicle 300 is not limited to any specific form and can be achieved through wireless communication or wireless sensing between the at least one intelligent communication device 900 or at least one wireless sensing stored value card 910 and the man-machine control interface 51.

Figure 15:
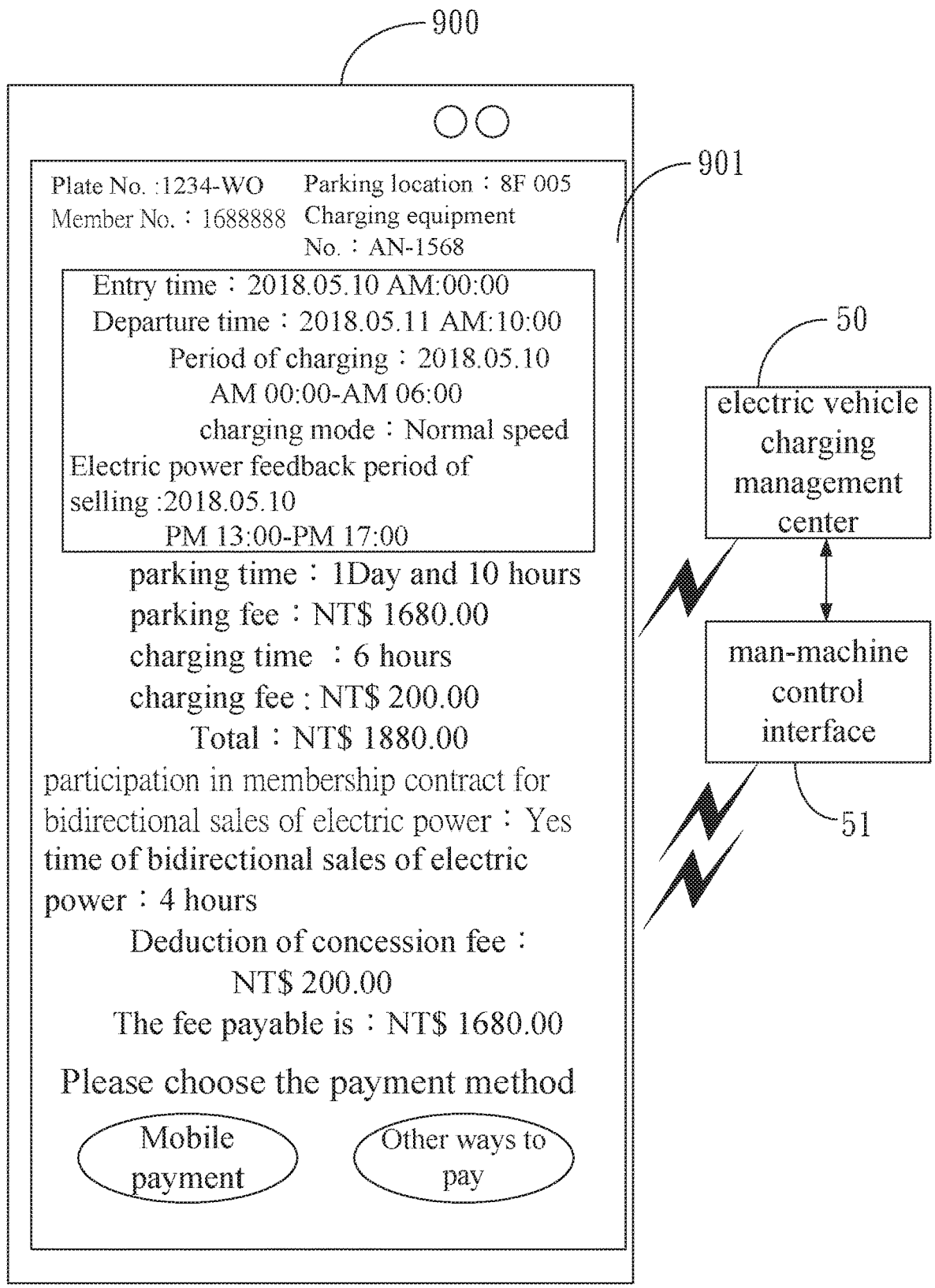
FIG. 15 is a schematic view illustrating a display screen of fee calculation and fee payment through connection established between a man-machine control interface and at least one intelligent communication device.

Referring to FIG. 15, a schematic view is provided to illustrate an operation screen 901 for fee calculation and fee payment through connection made with wireless communication between the man-machine control interface 51 and at least one intelligent communication device 900 as shown in FIG. 14. The man-machine control interface 51 transmits, through wireless communication, a result of calculation of the parking fee and the charging fee and options for fee payment to the intelligent communication device 900, and the intelligent communication device 900 displays the operation screen 901 corresponding to the fee calculation and fee payment options to allow the user to directly understand details of parking time, charging time, parking fee, charging fee, charging mode, and concession fee for the electric vehicle 300 parked on the vehicle carrying platform 21 of the parking tower 20 and to carry out direct touch control of the operation screen 901 of the intelligent communication device 900 in a simple way through for example mobile payment in order to complete fee payment for the parking fee and the charging fee. The way of fee calculation or fee rate for the parking time, the charging time, the parking fee, the charging fee, the concession fee of the electric vehicle 300 parked on the vehicle carrying platform 21 of the parking tower 20 is not limited to any specific form and fee calculation can be made on membership basis or non-membership basis. For example, for an electric vehicle 300 parked on the vehicle carrying platform 21 of the parking tower 20 for an extended period of time, in case of long term charging based on a regular rate mode and participation in membership contract for bidirectional sales of electric power, doubled discounts may be granted for parking fee and charging fee and reward for stored value of a wireless sensing stored value card 910. However, for an electric vehicle 300 parked on the vehicle carrying platform 21 of the parking tower 20 that does not belong to a member and is for short-term parking and carrying out a quick rate mode of charging, even if participation in directional sales of electric power for a short-term period is taken, only single discount for either parking fee or charging fee is granted. The operations involving charging rate modes, participation in long-term or short-term contracts of bidirectional sales of electric power, or consent or non-consent for participation, calculation of discounted fees, and options for fee payment can be carried out by using the man-machine control interface 51 (without electronic payment function or for user simply using a wireless sensing stored value card 910) or the intelligent communication device 900 (with electronic payment function).

In the above sixth embodiment of the electric vehicle parking energy supply system 100 shown in FIGS. 14 and 15, the way of fee calculation and fee payment for the parking time, the charging time, the parking fee, the charging fee, and the concession fee for an electric vehicle 300 parked on the vehicle carrying platform 21 of the parking tower 20 between the man-machine control interface 51 and the intelligent communication device 900 or the wireless sensing stored value card 910 and the operation screen 901 of the intelligent communication device 900 are provided as examples for illustrating an embodiment of the present invention and are not limited thereto.

Figure 16:
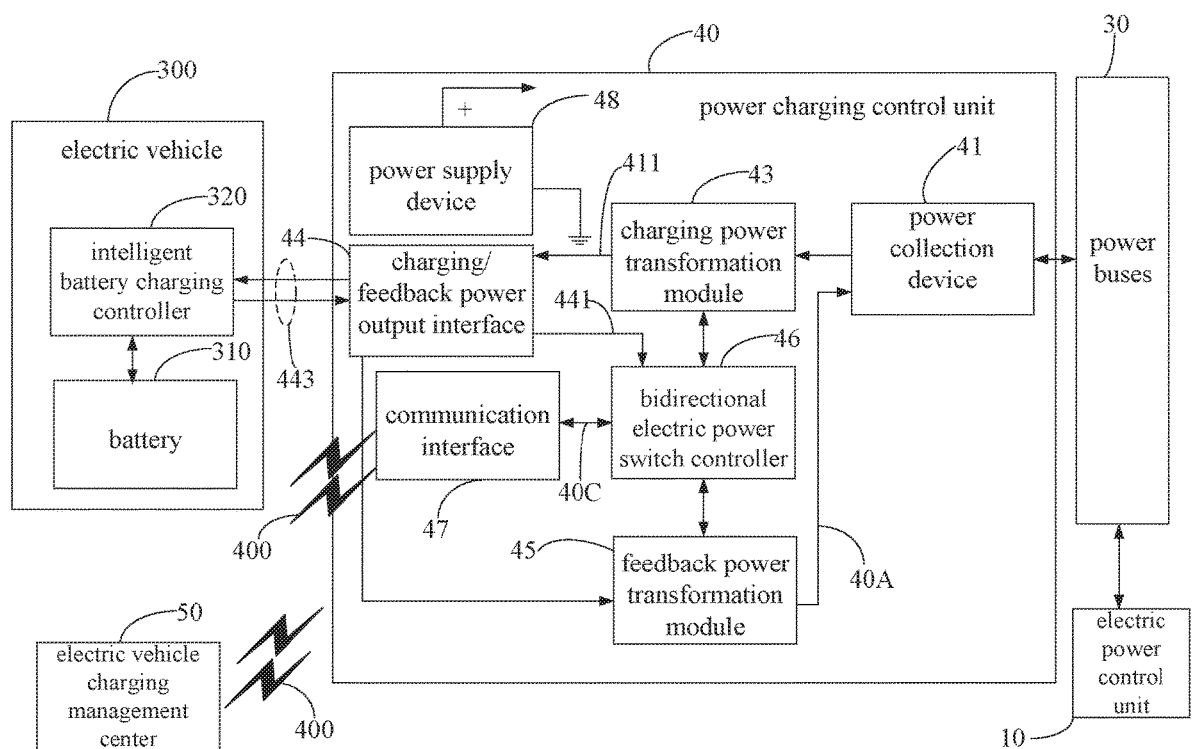
FIG. 16 illustrates an electric vehicle parking energy supply system according to a seventh embodiment of the present invention.

Referring to FIG. 16, a seventh embodiment of the electric vehicle parking energy supply system 100 according to the present invention is shown, wherein am electric vehicle 300 parked on the vehicle carrying platforms 21 may include, in the interior thereof, at least one intelligent battery charging controller 320. The intelligent battery charging controller 320 is connected with at least one battery 310 inside the electric vehicle 300. The charging/feedback power output interface 44 of the power charging control unit 40 is connected, through at least one charging cable 443, with the intelligent battery charging controller 320, so that the charging/feedback power output interface 44 may feed charging power 411 and a bidirectional power control command to the intelligent battery charging controller 320 to have the intelligent battery charging controller 320 following the bidirectional power control command so received to control the charging status of the battery 310 of the electric vehicle 300 or to supply electric power from the battery 310 through the intelligent battery charging controller 320 and the charging cable 443 back to the charging/feedback power output interface 44 of the power charging control unit 40 to provide an electric power feedback status.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An electric vehicle parking energy supply system, comprising:
   at least one electric power control unit, wherein the electric power control unit is connected with at least one electric power generation system, the electric power control unit comprising a bidirectional supply control function for multiple types of electric energy, the electric power control unit receiving electric power supplied from the electric power generation system for conversion into an output power;
   at least one parking tower, wherein the parking tower comprises a plurality of vehicle carrying platforms that are movable in multiple axes for receiving electric vehicles to park thereon, the parking tower being connected with the electric power control unit to receive the output power output from the electric power control unit to serve as electric power for movement and parking operation of the vehicle carrying platforms of the parking tower;
   a plurality of power buses, which are arranged longitudinally to each correspond to one side of a predetermined location of each of the vehicle carrying platforms of the parking tower and are connected with the electric power control unit to serve as an electric energy bidirectional supply channel of the electric power control unit;
   a plurality of power charging control units, wherein each power charging control unit is arranged on each vehicle carrying platform of the parking tower, each power charging control unit being operable for charging of the electric vehicle, each power charging control unit being provided with at least one power collection device, the power collection device being contactable and electrically connectable with the power buses when the vehicle carrying platforms are moved to predetermined parking positions to have the power charging control unit to supply charging power to the electric vehicle for charging, or to feed at least one type of feedback power formed of electric power of from at least one battery of the electric vehicle through the power buses into the electric power control unit to be converted by the electric power control unit into return-back power for output, the power charging control unit comprising a function of detecting a charging status of the battery of the electric vehicle and outputting battery charging status data; and
   at least one electric vehicle charging management center, which is connected with the electric power control unit and each power charging control unit, so that the electric vehicle charging management center is operable to remotely monitor and control, by way of connection through a network, the bidirectional energy supply of the electric power control unit and the charging status of the electric vehicle connected with each power charging control unit according to the output power output from the electric power control unit and the battery charging status data of each power charging control unit.

2. The electric vehicle parking energy supply system according to claim 1, wherein the electric power generation system connected with the electric power control unit is formed of a fuel cell based electric power generation system.

3. The electric vehicle parking energy supply system according to claim 1, wherein the electric power control unit is connected with an alternate-current commercial power supply.

4. The electric vehicle parking energy supply system according to claim 1, wherein the electric power control unit is connected with at least one type of clean energy.

5. The electric vehicle parking energy supply system according to claim 1, wherein the electric power control unit is connected with at least one battery exchange management center, the battery exchange management center being connected with at least one battery exchange cabinet and the electric vehicle charging management center to receive an remote monitor instruction from the electric vehicle charging management center to supply the return-back power output from the electric power control unit to each exchangeable battery located in the battery exchange cabinet as charging power, or allowing the electric vehicle charging management center to feed electric power from each exchangeable battery located in the battery exchange cabinet back to the electric power control unit.

6. The electric vehicle parking energy supply system according to claim 1, wherein the electric power control unit comprises:
- at least one input power conversion device, which is connected with the electric power generation system and the power buses, the input power conversion device receiving electric power supplied from the electric power generation system for conversion into output power to be output to the power buses;
- at least one output power conversion device, which is connected with the power buses to feed electric power from at least one battery inside the electric vehicle that is connected with the power charging control unit arranged on each vehicle carrying platform of the parking tower through the power charging control unit and the power buses into the output power conversion device in order to convert the electric power from the at least one battery of the electric vehicle with which each power charging control unit is connected into return-back power for output;
- at least one bidirectional power control device, which is connected with the input power conversion device and the output power conversion device to control timing of outputting of the output power of the input power conversion device and the return-back power of the output power conversion device;
- at least one communication interface, which is connected with the bidirectional power control device and the electric vehicle charging management center to receive the remote monitor instruction from the electric vehicle charging management center in order to feed the remote monitor instruction of the electric vehicle charging management center to the bidirectional power control device to serve as basis for the bidirectional power control device to control the timing of outputting of the output power of the input power conversion device and the return-back power of the output power conversion device; and
- at least one electric power unit, which is connected with the electric power generation system, at least one power bus, the input power conversion device, the output power conversion device, the bidirectional power control device, and the communication interface in order to convert the electric power generated by the electric power generation system or the electric power from the at least one battery of the electric vehicle that is connected with the at least one power charging control unit of the at least one power bus into at least one type of working power that is output to the input power conversion device, the output power conversion device, the bidirectional power control device, and the communication interface.

7. The electric vehicle parking energy supply system according to claim 6, wherein the output power conversion device of the electric power control unit is connected with at least one intelligent electric meter, the intelligent electric meter being connected with at least one commercial power supply so that the return-back power output from the output power conversion device is sold back to the commercial power supply by means of the intelligent electric meter.

8. The electric vehicle parking energy supply system according to claim 1, wherein the output power conversion device of the electric power control unit is connected with the electric power generation system in order to convert a portion of the electric power generated by the electric power generation system into the return-back power for output.

9. The electric vehicle parking energy supply system according to claim 6, wherein the parking tower is provided with a power supply section, and the output power conversion device of the electric power control unit is connected with the power supply section of the parking tower in order to output the return-back power of the output power conversion device to the power supply section.

10. The electric vehicle parking energy supply system according to claim 6, wherein the communication interface of the electric power control unit is connected via at least one network with the electric vehicle charging management center.

11. The electric vehicle parking energy supply system according to claim 6, wherein the communication interface of the electric power control unit is formed of a wireless communication interface in order to connect via at least one wireless network with the electric vehicle charging management center.

12. The electric vehicle parking energy supply system according to claim 1, wherein the power charging control units comprise:
- at least one charging power transformation module, which is connected with the power collection device, so that through the power collection device being set in contact with the power buses for the vehicle carrying platform that is moved to the predetermined parking position, the charging power transformation module receives the output power output from the electric power control unit for conversion into at least one type of charging power for output;
- at least one charging/feedback power output interface, which is connected with the charging power transformation module and the battery of the electric vehicle on the vehicle carrying platforms of the parking tower in order to feed the charging power converted and output by the charging power transformation module into the battery of the electric vehicle for charging, the charging/feedback power output interface being operable to detect a charging status of the battery of the electric vehicle on the vehicle carrying platforms of the parking tower and to output a battery charging status signal;
- at least one feedback power transformation module, which is connected with the power collection device and the charging/feedback power output interface, so that through the power collection device being set in contact with the power buses for the vehicle carrying platforms of the parking tower that are moved to the predetermined parking positions, electric power from the battery of the electric vehicle on the vehicle carrying platforms of the parking tower that is connected with the charging/feedback power output interface is converted by the feedback power transformation module into feedback power to be fed through the power collection device and the power buses into the electric power control unit;
- at least one bidirectional electric power switch controller, which is connected with the charging power transformation module, the feedback power transformation module, and the charging/feedback power output interface in order to control switching of output of the charging power output from the charging power transformation module and the feedback power output from the feedback power transformation module, the bidirectional electric power switch controller converting the battery charging status signal of the battery of the electric vehicle on the vehicle carrying platforms of the parking tower detected by the charging/feedback power output interface into battery charging status data for output;

at least one communication interface, which is connected with the bidirectional electric power switch controller and the electric vehicle charging management center to output the battery charging status data to the electric vehicle charging management center and to receive the remote monitor instruction from the electric vehicle charging management center in order to feed the remote monitor instruction of the electric vehicle charging management center to the bidirectional electric power switch controller to serve as basis for the bidirectional electric power switch controller to control the switching of output of the charging power output from the charging power transformation module and the feedback power output from the feedback power transformation module; and at least one power supply device, which is connected with the charging power transformation module, the charging/feedback power output interface, the feedback power transformation module, the bidirectional electric power switch controller, and the communication interface to supply working power required by the charging power transformation module, the charging/feedback power output interface, the feedback power transformation module, the bidirectional electric power switch controller, and the communication interface.

13. The electric vehicle parking energy supply system according to claim 12, wherein the charging/feedback power output interface of the power charging control unit is connected to a socket panel to allow the battery of the electric vehicle on the vehicle carrying platforms of the parking tower to connect through at least one power supply cable with the socket panel.

14. The electric vehicle parking energy supply system according to claim 12, wherein the charging/feedback power output interface of the power charging control unit is connected through at least one charging cable with at least one intelligent battery charging controller in the electric vehicle parked on the vehicle carrying platforms of the parking tower, the intelligent battery charging controller being connected with the at least one battery inside the electric vehicle.

15. The electric vehicle parking energy supply system according to claim 12, wherein the bidirectional electric power switch controller of the power charging control unit is connected with at least one power collection device driver, the power collection device driver being connected with the charging power transformation module and the power collection device with which the feedback power transformation module is connected, so that the power collection device driver controls and drives the power collection device to move downward for contacting with or to move upward for detaching from the power buses.

16. The electric vehicle parking energy supply system according to claim 12, wherein the power collection device driver with which the bidirectional electric power switch controller is connected is formed of a servo motor.

17. The electric vehicle parking energy supply system according to claim 12, wherein the power collection device of the power charging control unit is formed of a T-shaped power collection bow.

18. The electric vehicle parking energy supply system according to claim 12, wherein the power collection device of the power charging control unit comprises an insulation cover arranged to cover a surface thereof and is also provided, at one end thereof, with a power connection terminal for contacting a surface of the power buses.

19. The electric vehicle parking energy supply system according to claim 12, wherein the communication interface of the power charging control unit is formed of a wireless communication interface in order to connect, through at least one wireless network, with the electric vehicle charging management center.

20. The electric vehicle parking energy supply system according to claim 12, wherein the communication interface of the power charging control unit is connected with at least one network camera, the network camera being operable to picture live images of battery charging and parking operation of the battery of the electric vehicle on the vehicle carrying platforms of the parking tower for output through the communication interface.

21. The electric vehicle parking energy supply system according to claim 12, wherein the power supply device of the power charging control unit is formed of a chargeable battery.

22. The electric vehicle parking energy supply system according to claim 12, wherein the electric vehicle charging management center is connected with at least one man-machine control interface, the man-machine control interface being operable to allow a user to input and inquire identification of an electric vehicle parked on one of the vehicle carrying platforms of the parking tower and data and status of charging of a battery of the electric vehicle, and to enable calculation and payment of parking fee and charging fee of the electric vehicle.

* * * * *